United States Patent
Sasaki et al.

(10) Patent No.: US 9,255,634 B2
(45) Date of Patent: Feb. 9, 2016

(54) BRAKE ELEMENT FOR TRANSMISSION AND CONTROL SYSTEM THEREFOR

(71) Applicant: MAZDA MOTOR CORPORATION, Hiroshima (JP)

(72) Inventors: Masanori Sasaki, Hiroshima (JP); Masamichi Fujikawa, Hatsukaichi (JP); Shinya Kamada, Kure (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/431,284

(22) PCT Filed: Oct. 9, 2013

(86) PCT No.: PCT/JP2013/006010
§ 371 (c)(1),
(2) Date: Mar. 25, 2015

(87) PCT Pub. No.: WO2014/061234
PCT Pub. Date: Apr. 24, 2014

(65) Prior Publication Data
US 2015/0276045 A1    Oct. 1, 2015

(30) Foreign Application Priority Data

Oct. 18, 2012   (JP) .................................. 2012-230548

(51) Int. Cl.
*F16D 25/063*    (2006.01)
*F16H 57/10*     (2006.01)
(Continued)

(52) U.S. Cl.
CPC .............. *F16H 57/10* (2013.01); *F16D 25/063* (2013.01); *F16H 63/3026* (2013.01); *F16H 3/666* (2013.01); *F16H 2063/303* (2013.01);
(Continued)

(58) Field of Classification Search
None
See application file for complete search history.

(56) References Cited

U.S. PATENT DOCUMENTS

| 5,865,289 A | 2/1999 | Ishimaru |
| 7,841,457 B2 * | 11/2010 | Crafton ................. F16H 57/027 184/6.23 |
| 2005/0205378 A1 * | 9/2005 | Miyazaki ............ F16D 25/0638 192/48.8 |
| 2008/0314711 A1 | 12/2008 | Jayaram et al. |
| 2010/0200353 A1 * | 8/2010 | Wooden ................. F16D 21/06 192/48.8 |

FOREIGN PATENT DOCUMENTS

| JP | H09-196085 A | 7/1997 |
| JP | 2005-265063 A | 9/2005 |

(Continued)

OTHER PUBLICATIONS

International Search Report; PCT/JP2013/006010; Dec. 3, 2013.

*Primary Examiner* — Justin Holmes
(74) *Attorney, Agent, or Firm* — Studebaker & Brackett PC

(57) ABSTRACT

A first piston (65) that presses friction plates (69a, 69c) is fitted in a second piston (66) in such a manner as to be movable together with the second piston and relatively movable with respect to the second piston. An A-chamber (61) and a B-chamber (62) each configured to move a respective one of the first piston (65) and the second piston (66) by a stroke toward a side close to the friction plates, a return spring (161) biasing the second piston (66) on a side away from the friction plates, and a stopper member (160) configured to prevent a stroke of the second piston (66) toward the side close to the friction plates from becoming greater than a given value (W) are provided. Engagement responsiveness of a L-R brake (60) does not deteriorate even when a clearance (V) in the friction plates (69a, 69c) increases.

6 Claims, 13 Drawing Sheets

(51) Int. Cl.
*F16H 3/66* (2006.01)
*F16H 63/30* (2006.01)

(52) U.S. Cl.
CPC ... *F16H2200/0052* (2013.01); *F16H 2200/201* (2013.01); *F16H 2200/2043* (2013.01)

(56) References Cited

FOREIGN PATENT DOCUMENTS

| | | |
|---|---|---|
| JP | 2007-032604 A | 2/2007 |
| JP | 2009-185928 A | 8/2009 |

* cited by examiner

FIG.2

|  | LOW CLUTCH (40) | HIGH CLUTCH (50) | L-R BRAKE (60) | 2-6 BRAKE (70) | R-3-5 BRAKE (80) |
|---|---|---|---|---|---|
| 1ST SPEED | ○ |  | ○ |  |  |
| 2ND SPEED | ○ |  |  | ○ |  |
| 3RD SPEED | ○ |  |  |  | ○ |
| 4TH SPEED | ○ | ○ |  |  |  |
| 5TH SPEED |  | ○ |  |  | ○ |
| 6TH SPEED |  | ○ |  | ○ |  |
| REVERSE SPEED |  |  | ○ |  | ○ |

FIG.4
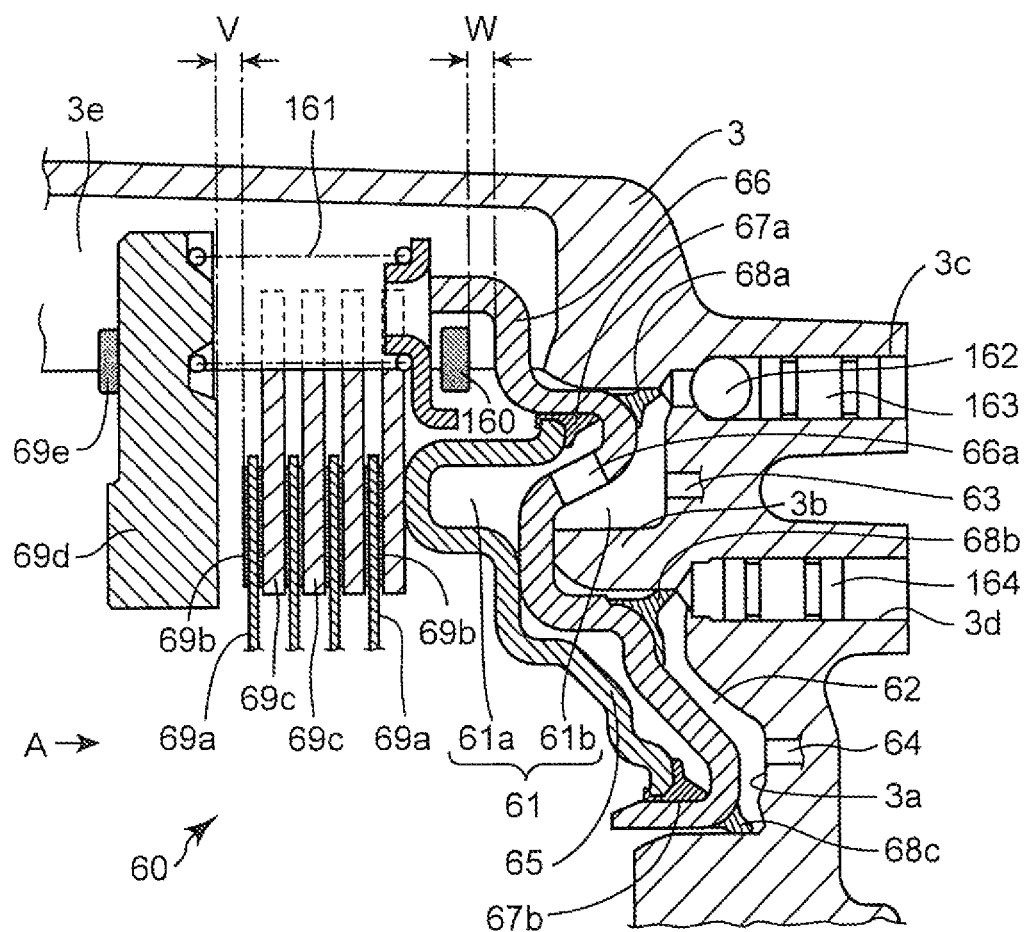
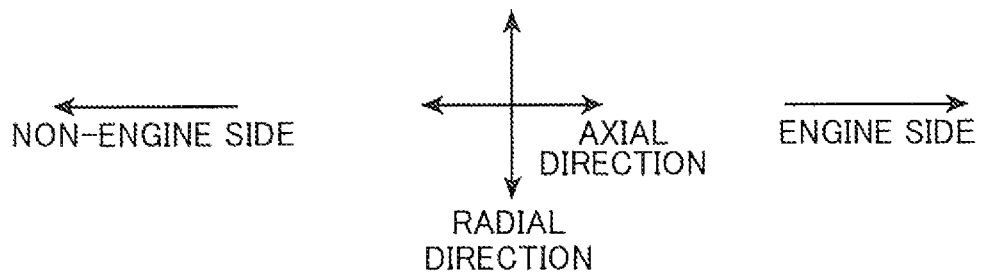

FIG.11
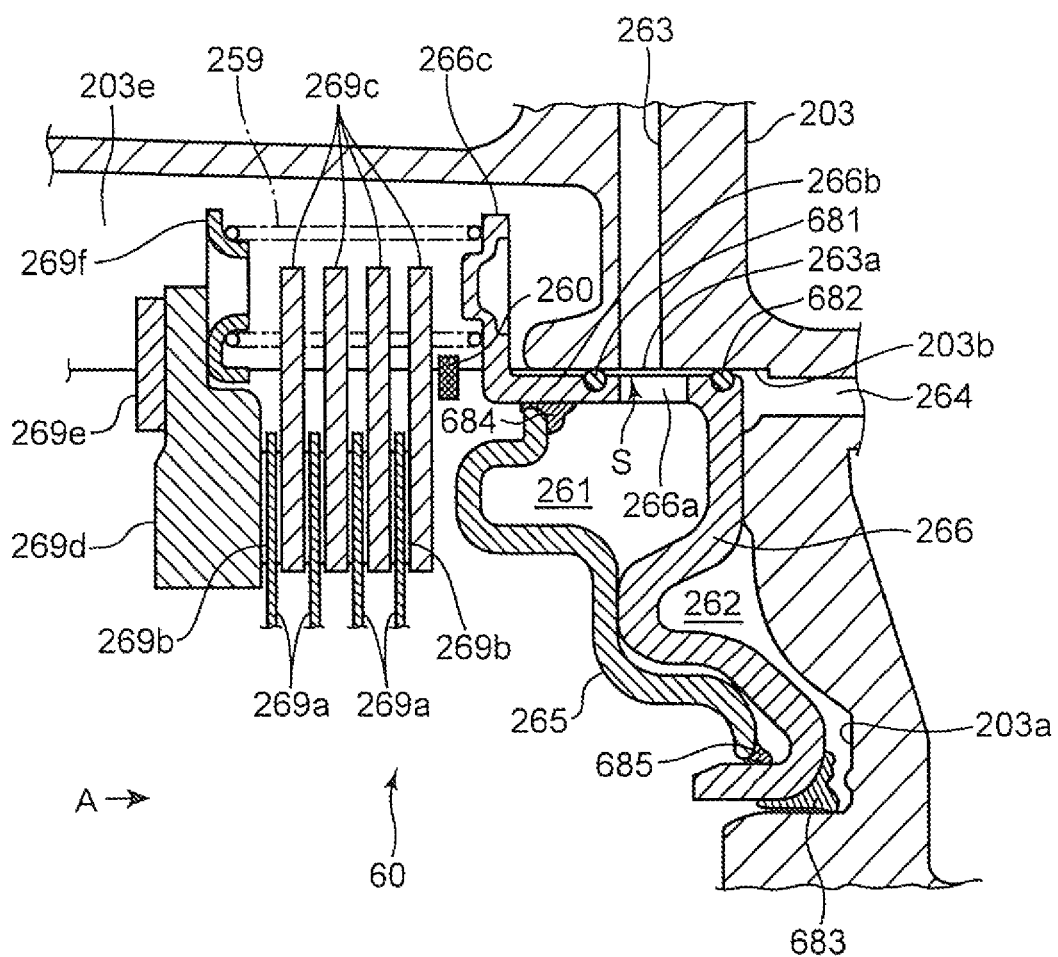
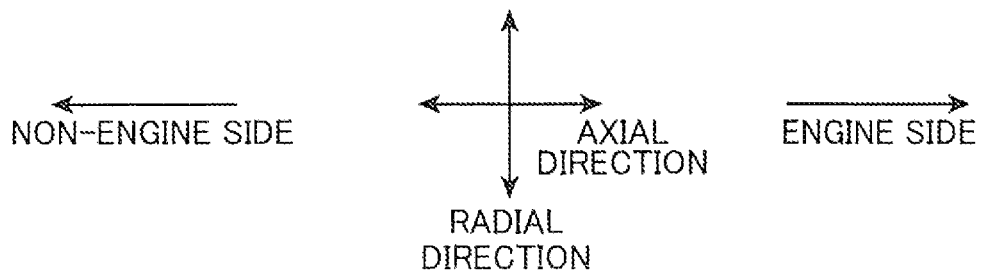

NON-ENGINE SIDE ← → | AXIAL DIRECTION ↕ | ENGINE SIDE →
RADIAL DIRECTION

BRAKE ELEMENT FOR TRANSMISSION AND CONTROL SYSTEM THEREFOR

TECHNICAL FIELD

The present invention relates to a brake element for a transmission mountable on a vehicle, and a control system for the brake element.

BACKGROUND ART

An automatic transmission mountable on a vehicle is equipped with a plurality of frictional engagement elements such as a clutch element and a brake element, and configured to selectively engage one or more of the frictional engagement elements depending on an engine operating state to thereby change a driving force transmission path of a speed change mechanism comprising planetary gear sets, to automatically perform a speed change operation to establish a given speed stage.

A brake element described in the following Patent Literature 1, comprises a first piston configured to press friction plates, and a second piston configured to press the first piston toward a side close to the friction plates, wherein the first piston and the second piston are arranged in series along a stroke direction thereof, in this order from the side of the friction plates. The brake element further comprises a return spring acting on the first piston to bias the first and second pistons toward a side away from the friction plates. When the brake element is in a disengaged state, both of the first and second pistons are moved toward the side away from the friction plates, and set at their respective initial positions.

Thus, when a possibility arises that the brake element is engaged, the second piston can be preliminarily moved by a stroke toward the side close to the friction plates to thereby move the first piston by a stroke toward the side close to the friction plates, so that it becomes possible to preliminarily narrow a clearance in the friction plates (The resulting position of the first piston and the resulting position of the second piston will hereinafter be referred to respectively as "standby position of the first piston" and "standby position of the second piston").

Then, when it becomes necessary to engage the brake element, the first piston can be moved from the standby position by a stroke toward the side close to the friction plates, so that it becomes possible to establish effective pressing of the friction plates by the first piston within a short period of time, because the clearance is preliminarily narrowed (The resulting position of the first piston will hereinafter be referred to as "pressing established position"). This makes it possible to engage the brake element with good responsiveness, i.e., engage the brake element accurately at an adequate timing, to thereby suppress a speed-change shock or the like due to a deviation in engagement timing of the brake element.

Meanwhile, in the brake element described in the Patent Literature 1,, the return spring acts on the first piston. Thus, every time the brake element is disengaged, each of the first and second pistons is returned to a position most away from the friction plates, in a stroke range thereof. More specifically, the initial position of the first piston is a position most away from the friction plates, in a stroke range thereof, and the initial position of the second piston is also a position most away from the friction plates, in a stroke range thereof, so that a relative positional relationship between the first and second pistons at their initial positions never changes. Further, the second piston is moved by a stroke toward the side close to the friction plates, until this movement is restricted by a wall surface of a transmission casing, a stopper member or the like, so that the standby position of the second piston is structurally determined That is, the standby position of the first piston whose initial position relative to the initial position of the second piston never changes is also structurally determined, so that the standby position of the first piston never changes.

Thus, for example, in a situation where the friction plates have a relatively large clearance due to an individual difference between brake elements, or in a situation where the friction plates are worn away due to aging to cause an increase in the clearance, a distance between the standby position and the pressing established position of the first piston increases. This results in an increase in time necessary for the first piston to establish effective pressing of the friction plates, causing deterioration in responsiveness regarding engagement of the brake element and thus deterioration in accuracy of engagement timing of the brake element.

CITATION LIST

Patent Literature

Patent Literature 1:, JP 2005-265063A (Paragraphs [0014] to [0019] and FIG. 2)

SUMMARY OF INVENTION

It is therefore an object of the present invention to provide a brake element for a transmission, capable of preventing deterioration in responsiveness regarding engagement of the brake element and thus preventing deterioration in accuracy of engagement timing of the brake element, even if a clearance in friction plates increases due to an individual difference between brake elements and/or aging of the brake element, and a control system for the brake element.

The present invention provides a brake element for a transmission, which comprises a first piston configured to press friction plates, and a second piston configured to move the first piston toward a side close to the friction plates, wherein the first piston and the second piston are arranged in series along a stroke direction thereof, in this order from the side of the friction plates. The brake element is characterized in that the first piston is fitted in the second piston in such a manner as to be movable together with the second piston and relatively movable with respect to the second piston, wherein the brake element further comprises: a first oil pressure chamber configured to be supplied with an oil pressure for moving the first piston by a stroke toward the side close to the friction plates; a second oil pressure chamber configured to be supplied with an oil pressure for moving the second piston by a stroke toward the side close to the friction plates; a biasing member biasing a piston toward a side away from the friction plates; and a restriction member configured to prevent a stroke of a piston toward the side close to the friction plates from becoming greater than a given value, wherein each of the biasing member and the restriction member is provided with respect to the second piston, without being provided with respect to the first piston.

The present invention also provides a control system for a brake element for a transmission. The brake element comprises a first piston configured to press a friction plates, and a second piston configured to move the first piston toward a side close to the friction plates, wherein the first piston and the second piston are arranged in series along a stroke direction thereof, in this order from the side of the friction plates; and wherein the first piston is fitted in the second piston in such a manner as to be movable together with the second piston and relatively movable with respect to the second piston, and wherein the brake element further comprises a first oil pressure chamber configured to be supplied with an oil pressure for moving the first piston by a stroke toward the side close to the friction plates, a second oil pressure chamber configured to be supplied with an oil pressure for moving the second piston by a stroke toward the side close to the friction plates, a biasing member biasing the second piston toward a side away from the friction plates, and a restriction member configured to prevent a stroke of the second piston toward the side close to the friction plates from becoming greater than a given value. The control system is characterized in that it comprises an oil pressure control device configured to control supply and discharge of an oil pressure with respect to the first oil pressure chamber and the second oil pressure chamber, wherein the oil pressure control device is operable, when it is necessary to set the brake element to a disengaged state, to (1) supply no oil pressure to the first oil pressure chamber and the second oil pressure chamber to thereby move the second piston and the first piston toward the side away from the friction plates by a biasing force of the biasing member, to set the second piston and the first piston at their respective initial positions; when it is necessary to engage the brake element being in the disengaged state, to (2) supply an oil pressure to the second oil chamber to thereby move each of the second piston and the first piston by a stroke toward the side close to the friction plates, to set the second piston and the first piston at their respective standby positions determined by the restriction member, and then, to (3) supply an oil pressure to the first oil chamber to thereby move only the first piston by a stroke toward the side close to the friction plates, to set the first piston at a pressing established position where effective pressing of the friction plates is established; and when it is necessary to disengage the brake element being in the engaged state, to (4) discharge the oil pressure in the first oil pressure chamber to thereby move only the first piston toward the side away from the friction plates, to set the first piston at a zero-clearance position where a pressed state of the friction plates is released, and then, to (5) discharge the oil pressure in the second oil pressure chamber to thereby move the second piston and the first piston toward the side away from the friction plates by the biasing force of the biasing member, while maintaining a relative positional relationship between the first piston and the second piston, to set the second piston and the first piston at their respective initial positions.

These and other objects, features, and advantages of the present invention will become apparent upon reading of the following detailed description along with the accompanying drawings.

BRIEF DESCRIPTION OF DRAWINGS

FIG. 2 is an engagement table of the automatic transmission.

FIG. 4 is a sectional view illustrating a structure of an L-R brake (low-reverse brake) in the automatic transmission.

FIG. 11 is a sectional view similar to FIG. 4, which illustrates a structure of an L-R brake according to a second embodiment of the present invention.

DESCRIPTION OF EMBODIMENTS

With reference to the drawings, an embodiment of the present invention will now be described.

<First Embodiment>

(1) Overall Structure

Figure 1:
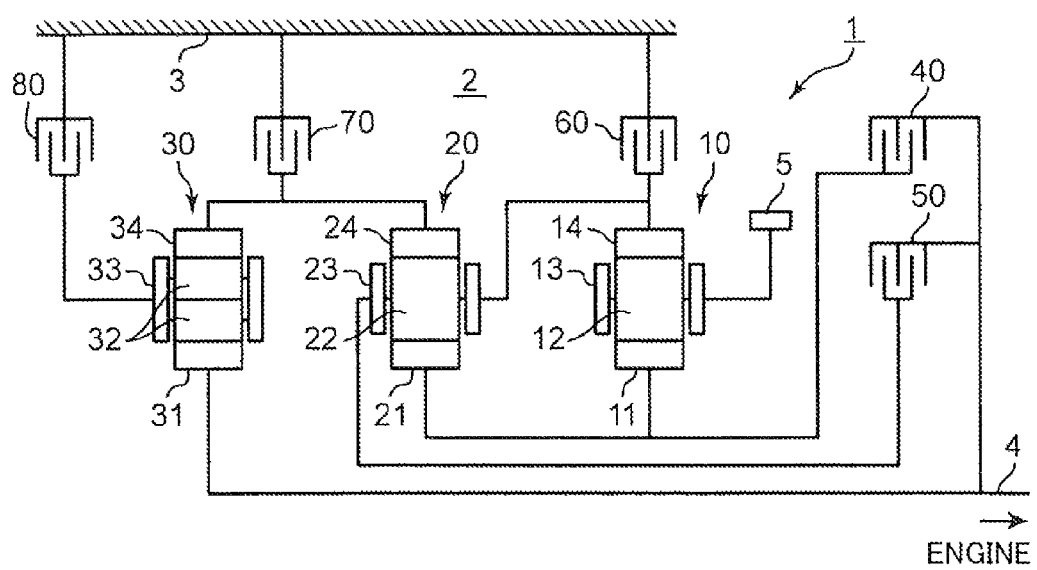
FIG. 1 is a skeleton diagram of an automatic transmission according to a first embodiment of the present invention.

In the first embodiment, the present invention is applied to an automatic transmission 1 illustrated in FIG. 1. The automatic transmission 1 is mounted, for example, on a transversely mounted engine-equipped automotive vehicle such as a front-engine front-drive car, wherein it comprises a speed change mechanism 2 and a transmission casing 3 housing the speed change mechanism 2. An output rotation of a non-illustrated engine is input into an input shaft 4 of the speed change mechanism 2 via a non-illustrated torque converter. An output rotation of the speed change mechanism 2 is extracted from an output gear 5 and transmitted to drive wheels via a non-illustrated differential unit.

The speed change mechanism 2 comprises a first planetary gear set 10, a second planetary gear set 20, and a third planetary gear set 30. These are coaxially arranged side-by-side on an axis of the input shaft 4 in the above order from the side of the engine to form a plurality of driving force transmission paths in the speed change mechanism 2.

The speed change mechanism 2 further comprises a low clutch 40, a high clutch 50, an L-R brake (low-reverse brake) 60, a 2-6, brake 70, and an R-3-5, brake 80. These are frictional engagement elements (i.e., clutch elements and brake elements), and coaxially arranged side-by-side on the axis of the input shaft 4 in the above order from the side of the engine.

Each of the first planetary gear set 10 and the second planetary gear set 20 is a single pinion type, and the third planetary gear set 30 is a double pinion type. Each of the first to third planetary gear sets 10, 20, 30 comprises a sun gear 11, 21, 31, a pinion 12, 22, 32 (in the third planetary gear set 30, an inner pinion) meshed with the sun gear 11, 21, 31, a carrier 13, 23, 33 supporting the pinion 12, 22, 32, and an internal gear 14, 24, 34 meshed with the pinion 12, 22, 32 (in the third planetary gear set 30, an outer pinion).

The sun gear 11 of the first planetary gear set 10 and the sun gear 21 of the second planetary gear set 20 are coupled together, and then releasably coupled to the input shaft 4 via the low clutch 40.

The internal gear 14 of the first planetary gear set 10 and the carrier 23 of the second planetary gear set 20 are coupled together, and then releasably coupled to the input shaft 4 via the high clutch 50 and to the transmission casing 3 via the L-R brake 60.

The internal gear 24 of the second planetary gear set 20 and the internal gear 34 of the third planetary gear set 30 are coupled together, and then releasably coupled to the transmission casing 3 via the 2-6, brake 70.

The carrier 33 of the third planetary gear set 30 is releasably coupled to the transmission casing 3 via the R-3-5, brake 80, and the sun gear 31 of the third planetary gear set 30 is coupled to the input shaft 4. The carrier 13 of the first planetary gear set 10 is coupled to the output gear 5.

The automatic transmission 1 according to the first embodiment is configured to selectively engage one or more of the frictional engagement elements 40, 50, 60, 70, 80, as illustrated in the engagement table of FIG. 2 (the circle mark O indicates an engaged state), to thereby switch between the plurality of driving force transmission paths of the planetary gear sets 10, 20, 30 to establish forward 1st to 6th speed stages and a reverse speed stage.

In the forward 1st speed stage as one example of a vehicle-start speed stage, the low clutch 40 and the L-R brake 60 are engaged. A rotation of the input shaft 4 is input into the sun gear 11 of the first planetary gear set 10. The input rotation is reduced in rotational speed at a large speed reduction ratio by the first planetary gear set 10, and then extracted from the output gear 5 via the carrier 13 of the first planetary gear set 10.

In the forward 2nd speed stage, the low clutch 40 and the 2-6, brake 70 are engaged. A rotation of the input shaft 4 is input into the sun gear 11 of the first planetary gear set 10 and input into the internal gear 14 of the first planetary gear set 10 via the carrier 23 of the second planetary gear set 20. The input rotation is reduced in rotational speed at a speed reduction ratio less that that in the 1st speed stage, and then extracted from the output gear 5 via the carrier 13 of the first planetary gear set 10.

In the forward 3rd speed stage, the low clutch 40 and the R-3-5, brake 80 are engaged. A rotation of the input shaft 4 is input into the sun gear 11 of the first planetary gear set 10 and input into the internal gear 14 of the first planetary gear set 10 via the internal gear 34 of the third planetary gear set 30 and the carrier 23 of the second planetary gear set 20. The input rotation is reduced in rotational speed at a speed reduction ratio less that that in the 2nd speed stage, and then extracted from the output gear 5 via the carrier 13 of the first planetary gear set 10.

In the forward 4th speed stage, the low clutch 40 and the high clutch 50 are engaged. A rotation of the input shaft 4 is input into the sun gear 11 of the first planetary gear set 10 and input into the internal gear 14 of the first planetary gear set 10 via the carrier 23 of the second planetary gear set 20 (no speed reduction). The input rotation causes the entire first planetary gear set 10 to be rotated in integral relation with the input shaft 4, so that the rotation at a speed reduction ratio of 1, is extracted from the output gear 5 via the carrier 13 of the first planetary gear set 10.

In the forward 5th speed stage, the high clutch 50 and the R-3-5, brake 80 are engaged. A rotation of the input shaft 4 is input into the sun gear 11 of the first planetary gear set 10 via the internal gear 34 of the third planetary gear set 30 and the sun gear 21 of the second planetary gear set 20, and input into the internal gear 14 of the first planetary gear set 10 via the carrier 23 of the second planetary gear set 20 (no speed reduction). The input rotation is increased in rotational speed, and then extracted from the output gear 5 via the carrier 13 of the first planetary gear set 10.

In the forward 6th speed stage, the high clutch 50 and the 2-6, brake 70 are engaged. A rotation of the input shaft 4 is input into the sun gear 11 of the first planetary gear set 10 via the sun gear 21 of the second planetary gear set 20, and input into the internal gear 14 of the first planetary gear set 10 via the carrier 23 of the second planetary gear set 20 (no speed reduction). The input rotation is increased in rotational speed at a speed increase ratio greater that that in the 5th speed stage, and then extracted from the output gear 5 via the carrier 13 of the first planetary gear set 10.

In the reverse speed stage as another example of the vehicle-start speed stage, the L-R brake 60 and the R-3-5, brake 80 are engaged. A rotation of the input shaft 4 is input into the sun gear 11 of the first planetary gear set 10 via the internal gear 34 of the third planetary gear set 30 and the sun gear 21 of the second planetary gear set 20. The input rotation is reduced in rotational speed at a relatively large speed reduction by the first planetary gear set 10 while being reversed in terms of a rotation direction by the second planetary gear set 20, and then extracted from the output gear 5 via the carrier 13 of the first planetary gear set 10, as a rotation having a rotation direction reverse to that of the input shaft 4.

Figure 3:
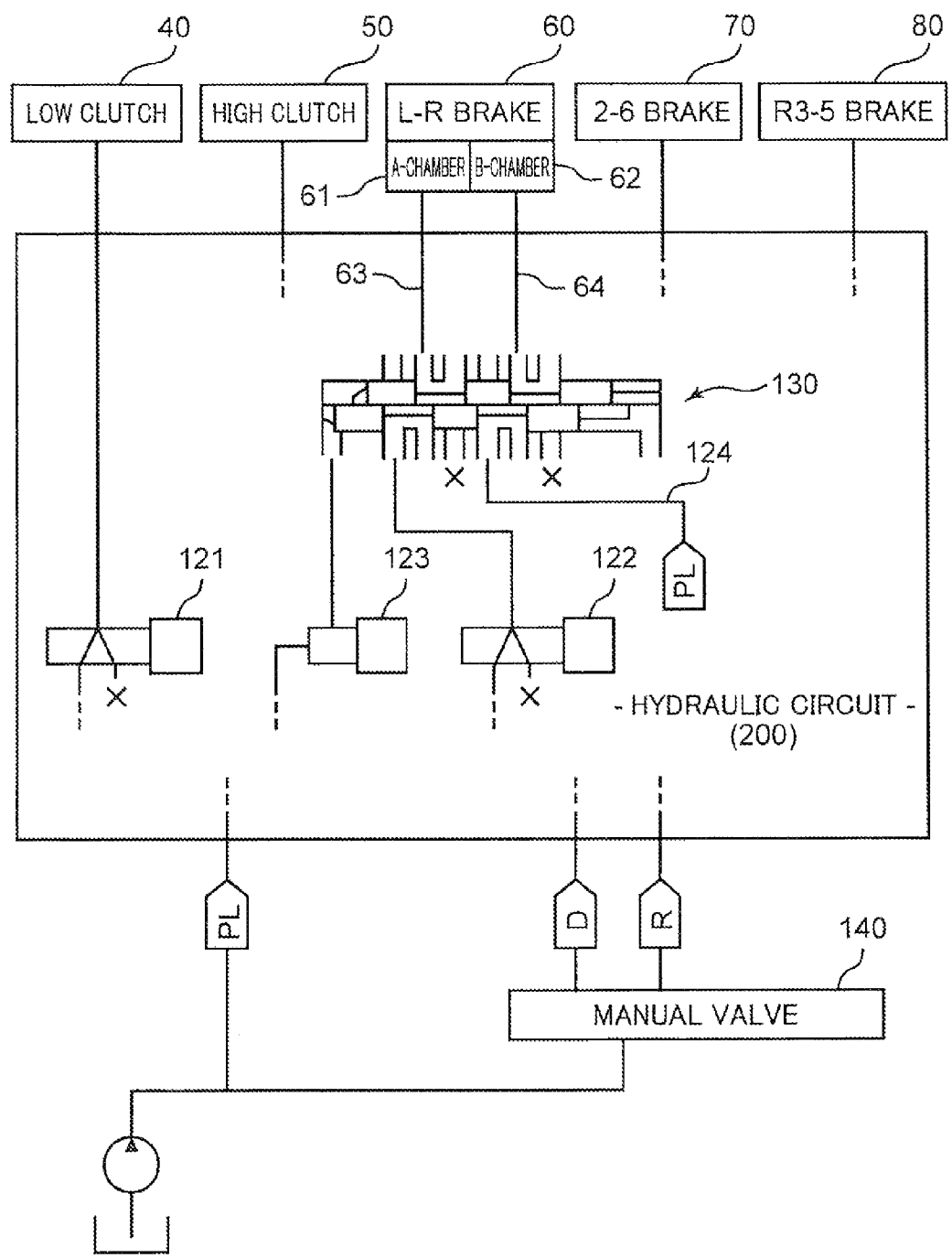
FIG. 3 is a block diagram illustrating an oil pressure path from an oil pump to each frictional engagement element in the automatic transmission.

As illustrated in FIG. 3, in the first embodiment, an oil pressure discharged from an oil pump is adjusted to become equal to a given line pressure (indicated by "PL" in FIG. 3) by a regulator valve (not illustrated), and then continually supplied to a hydraulic circuit 200 via a dedicated oil passage, wherein, when a D range or an R range is selected, the oil pressure is also supplied to the hydraulic circuit 200 via a manual valve 140.

The hydraulic circuit 200 comprises a first linear solenoid valve (hereinafter abbreviated as "SV") 121, a second linear SV 122, an on-off SV 123 and a shift valve 130. The first linear SV 121 is designed to supply the oil pressure to an oil pressure chamber of the low clutch 40. The second linear SV 122 is designed to supply the oil pressure to an aftermentioned A-chamber 61 (first oil pressure chamber) of the L-R brake 60. The on-off SV 123 is designed to switch between two positions of a spool of the shift valve 130. The shift valve 130 is designed to establish or block communication between the second linear SV 122 and the A chamber 61, and establish or block communication between a given line pressure supply oil passage 124 and an aftermentioned B-chamber 62 (second oil pressure chamber) of the L-R brake 60. The spool of the shift valve 130 is always biased leftwardly (in FIG. 3) by a non-illustrated return spring. An A-chamber oil passage 63 is provided between the shift valve 130 and the A-chamber 61, and a B-chamber oil passage 64 is provided between the shift valve 130 and the B-chamber 62.

The on-off SV 123 is a normal open type. Thus, the on-off SV 123 is operable, in its non-energized (OFF) state, to output the oil pressure to set the spool of the shift valve 130 at a rightmost (in FIG. 3) position. Each of the first and second linear SV 121, 122 is a normal closed type. Thus, each of the first and second linear SV 121, 122 is operable, in its non-energized (OFF) state, not to supply the oil pressure to a corresponding one of the frictional engagement elements, i.e., a corresponding one of the low clutch 40 and the L-R brake 60.

(2) Structure of L-R Brake

Figure 5:
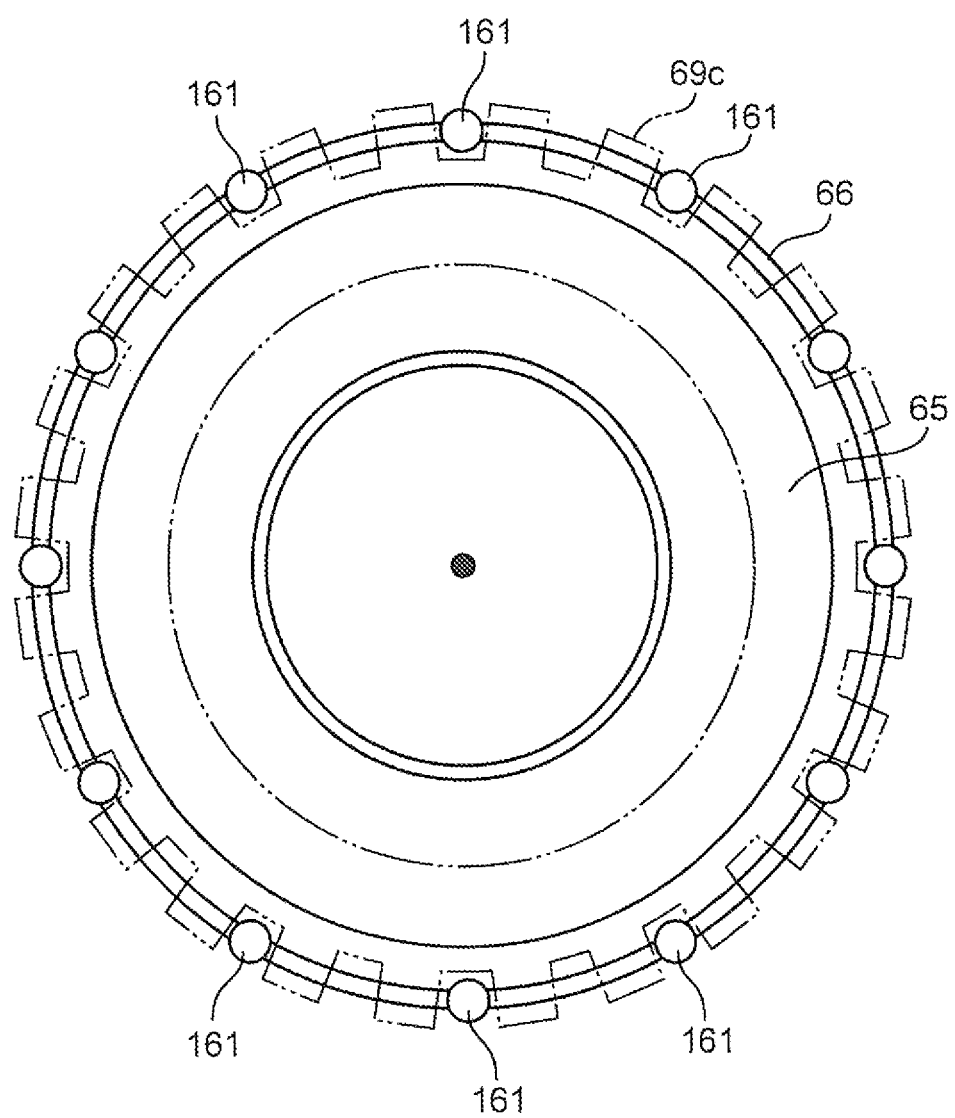
FIG. 5 is a schematic diagram illustrating a positional relationship of a first piston, a second piston, a driven plate and a return spring of the L-R brake, when viewed in an axial direction A in FIG. 4.
Figure 6:
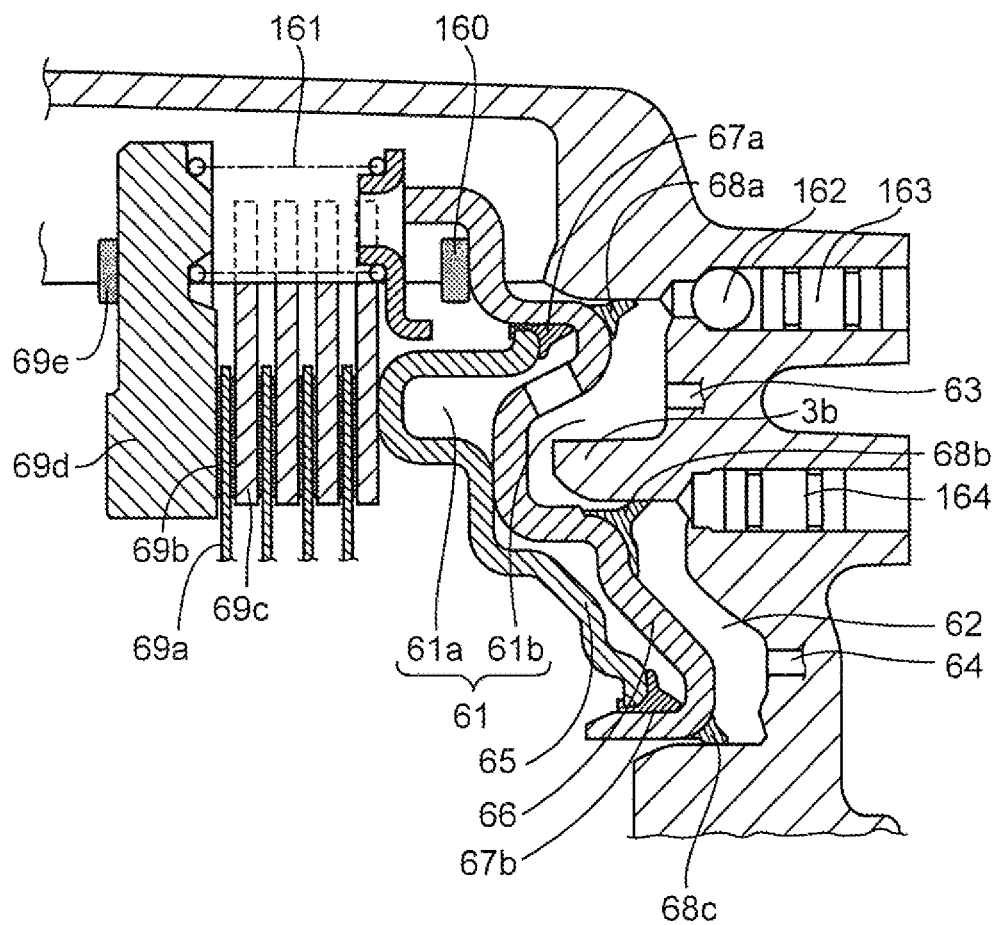
FIG. 6 is a sectional view similar to FIG. 4, which illustrates an operating state of the L-R brake.
Figure 7:
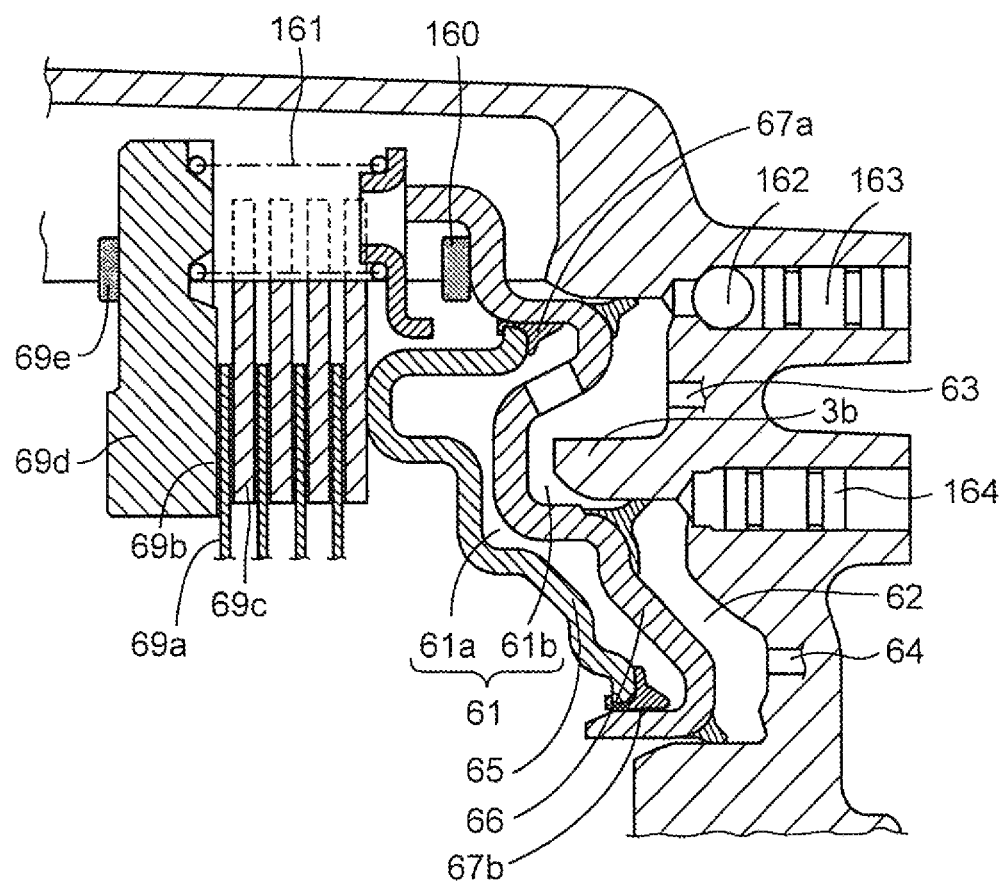
FIG. 7 is a sectional view similar to FIG. 4, which illustrates another operating state of the L-R brake.

Next, a structure of the L-R brake 60 as a distinctive part of the first embodiment will be described based on FIGS. 4 to 7. In FIGS. 4, 6 and 7, the right side and the left side are, respectively, an engine side (non-friction plate side) and a non-engine side (friction plate side), and the horizontal direction and the vertical direction are, respectively, an axial direction (i.e., stroke direction) and a radial direction.

As illustrated in FIG. 4, in the first embodiment, the L-R brake 60 comprises, as primary components, two oil pressure chambers (an A-chamber 61 and a B-chamber 62), two pistons (a first piston 65 and a second piston 66), and a plurality of friction plates (a drive plate 69a, and a driven plate 69c). The first piston 65 and the second piston 66 are coaxially arranged side-by-side on the axis of the input shaft 4, and in series along the stroke direction, in this order from the side of the friction plates 69a,, 69c.

The first piston 65 has a circular ring shape when viewed in an axial direction A (see FIG. 5), and comprises an outer peripheral portion bulged toward the non-engine side, an intermediate portion extending in the radial direction, and an inner peripheral portion inclined toward an engine side, as illustrated in FIG. 4. The second piston 66 also has a circular ring shape when viewed in the axial direction A (see FIG. 5), and comprises an outer rim portion protruding toward the non-engine side, an outer peripheral portion bulged toward the engine side, an intermediate portion bulged toward the non-engine side, an inner peripheral portion inclined toward the engine side, and an inner rim portion protruding toward the non-engine side, as illustrated in FIG. 4.

The first piston 65 has a smaller outer diameter and a larger inner diameter, as compared to the second piston 66. The first piston 65 is fitted in a non-engine-side surface of the second piston 66.

A first outer-peripheral sealing member 67a, and a first inner-peripheral sealing member 67b, are attached, respectively, to an outer edge of the outer peripheral portion and an inner edge of the inner peripheral portion of the first piston 65. The first outer-peripheral sealing member 67a, is configured to be slidable with respect to the second piston 66 while being kept in contact with the outer peripheral portion of the second piston 66. The first inner-peripheral sealing member 67b, is configured to be slidable with respect to the second piston 66 while being kept in contact with the inner rim portion of the second piston 66. Each of the first outer-peripheral sealing member 67a, and the first inner-peripheral sealing member 67b, is oil-tightly attached to the first piston 65. Thus, the first outer-peripheral sealing member 67a, and the first inner-peripheral sealing member 67b, define a part of the A-chamber 61 (more specifically, an actuating sub-A-chamber 61a, constituting the A-chamber 61) between the first piston 65 and the second piston 66 (see FIG. 7). Through the first outer-peripheral sealing member 67a, and the first inner-peripheral sealing member 67b,, the first piston 65 is fitted in the second piston 66 in such a manner as to be movable together with the second piston 66 and relatively movable with respect to the second piston 66.

The transmission casing 3 is provided with a concave portion 3a, having an opening on the non-engine side. The concave portion 3a, has a circular ring shape when viewed in the axial direction A, and a radially intermediate region thereof is formed as a protrusion (hereinafter referred to as "intermediate protrusion") 3b. The second piston 66 is fitted in the concave portion 3a.

A second outer-peripheral sealing member 68a,, a second intermediate sealing member 68b, and a second inner-peripheral sealing member 68c, are attached, respectively, to the outer peripheral portion, the intermediate portion and the inner peripheral portion of the second piston 66. The second outer-peripheral sealing member 68a, is configured to be slidable with respect to the concave portion 3a, while being kept in contact with an outer peripheral wall of the concave portion 3a. The second intermediate sealing member 68b, is configured to be slidable with respect to the concave portion 3a, while being kept in contact with a peripheral wall of the intermediate protrusion 3b. The second inner-peripheral sealing member 68c, is configured to be slidable with respect to the concave portion 3a, while being kept in contact with an inner peripheral wall of the concave portion 3a. Each of the second outer-peripheral sealing member 68a,, the second intermediate sealing member 68b, and the second inner-peripheral sealing member 68c, is oil-tightly attached to the second piston 66. Thus, the second outer-peripheral sealing member 68a, and the second intermediate sealing member 68b, define a part of the A-chamber 61 (more specifically, a non-actuating sub-A-chamber 61b constituting the A-chamber 61) between the outer peripheral portion of the second piston 66 and an outer peripheral region of the concave portion 3a, (see FIG. 6). Further, the second intermediate sealing member 68b, and the second inner-peripheral sealing member 68c, define the B-chamber 62 between the inner peripheral portion of the second piston 66 and an inner peripheral region of the concave portion 3a, (see FIG. 4). Through the second sealing members 68a,, 68b,, 68c,, the second piston 66 is movably fitted in the concave portion 3a.

As illustrated in FIG. 4, the A-chamber oil passage 63 from the shift valve 130 is led to penetrate through a casing wall of the transmission casing 3, and opened in a bottom wall of the concave portion 3a, as a part of the outer peripheral region thereof concaved toward the engine side. Similarly, the B-chamber oil passage 64 from the shift valve 130 is led to penetrate through the casing wall of the transmission casing 3, and opened in a bottom wall of the concave portion 3a, as a part of the inner peripheral region thereof concaved toward the engine side. The A-chamber oil passage 63 is opened at a radially intermediate position between the second outer-peripheral sealing member 68a, and the second intermediate sealing member 68b,, i.e., opened to the non-actuating sub-A-chamber 61b,, and the B-chamber oil passage 64 is opened at a radially intermediate position between the second intermediate sealing member 68b, and the second inner-peripheral sealing member 68c,, i.e., opened to the B-chamber 62.

The outer peripheral portion of the second piston 66 is provided with a communication hole 66a, communicating between the actuating sub-A-chamber 61a, and the non-actuating sub-A-chamber 61b. The oil pressure supplied to the non-actuating sub-A-chamber 61b, via the A-chamber oil passage 63 is supplied to the actuating sub-A-chamber 61a, via the communication hole 66a. In response to the oil pressure supplied to the actuating sub-A-chamber 61a,, the first piston 65 is moved by a stroke toward the non-engine side, i.e., toward a side close to the friction plates 69a,, 69c,, (see FIG. 7). That is, the A-chamber 61 is an oil pressure chamber configured to be supplied with an oil pressure for moving the first piston 65 by a stroke toward the side close to the friction plates 69a,, 69c,, and the first piston 65 is a piston configured to press the friction plates 69a,, 69c.

In response to the oil pressure supplied to the B-chamber 62 via the B-chamber oil passage 64, the second piston 66 is moved by a stroke toward the non-engine side, i.e., toward the side close to the friction plates 69a,, 69c, (see FIG. 6). That is, the B-chamber 62 is an oil pressure chamber configured to be supplied with an oil pressure for moving the second piston 66 by a stroke toward the side close to the friction plates 69a,, 69c,, and the second piston 66 is a piston configured to move the first piston 65 toward the side close to the friction plates 69a, 69c.

As illustrated in FIG. 4, the transmission casing 3 is formed with an A-chamber air release passage 3c, present at an uppermost position of the A-chamber 61, and a B-chamber air release passage 3d, present at an uppermost position of the B-chamber 62.

A rubber ball 162 and an A-chamber air release plug 163 are inserted in the A-chamber air release passage 3c. When a negative pressure is produced in the A-chamber 61, the rubber ball 162 is moved to come into contact with a tapered surface of the A-chamber air release passage 3c, to thereby close the A chamber 61. On the other hand, when the oil pressure is supplied to the A-chamber 61, the rubber ball 162 is moved to separate from the tapered surface to allow air mixed in the A-chamber 61 to pass over the rubber ball 162. The air that passes over the rubber ball 162 is discharged to an outside of the transmission casing 3 after passing through a gap between the A-chamber air release plug 163 and the A-chamber air release passage 3c.

A B-chamber air release plug 164 is inserted in the B-chamber air release passage 3d. When the oil pressure is supplied to the B-chamber 62, air mixed in the B-chamber 62 is discharged to the outside of the transmission casing 3 after passing through a gap between the B-chamber air release plug 164 and the B-chamber air release passage 3d.

The drive plate 69a, is spline-engaged with an outer peripheral surface of the internal gear 14 of the first planetary gear set 10 (see FIG. 1). A facing material 69b, is bonded to each of opposite surfaces of the drive plate 69a. The driven plate 69c, is spline-engaged with an inner spline section 3e, of the transmission casing 3. A retaining plate 69d, is also spline-engaged with the inner spline section 3e. A movement of the retaining plate 69d toward the non-engine side is restricted by a snap ring 69e.

The L-R brake 60 according to this embodiment is a multiplate brake in which a plurality of the drive plates 69a, and a plurality of the driven plates 69c, are disposed in an alternate arrangement. Then, these friction plates 69a,, 69c, are disposed while being sandwiched between the retaining plate 69d, and the outer peripheral portion of the first piston 65 bulged toward the non-engine side (the outer peripheral portion will hereinafter be referred to occasionally as "pressing portion"). A movement of the friction plates 69a,, 69c, toward the non-engine side is restricted by the retaining plate 69d.

A return spring (biasing member) 161 is interposed between the retaining plate 69d and the outer rim portion of the second piston 66. As illustrated in FIG. 5, the return spring 161 is provided in a plural number, wherein the plurality of return springs 161 are arranged at even intervals in a circumferential direction of the second piston 66. The return springs 161 act only on the second piston 66 without acting on the first piston 65 to bias the second piston 66 and the first piston 65 fitted in the second piston 66 toward a side away from the friction plates 69a,, 69c.

A stopper member (restriction member) 160 composed of a snap ring is provided in the inner spline section 3e, at a position adjacent to the outer rim portion of the second piston 66. More specifically, the stopper member 160 is disposed at a position where a radially-extending portion of the second piston 66 between the outer rim portion protruding toward the non-engine side and the outer peripheral portion bulged toward the engine side comes into contact therewith, to thereby prevent (restrict) a stroke of the second piston 66 toward the non-engine side, i.e., toward the side close to the friction plates 69a,, 69c,, from becoming greater than a given value (aftermentioned stroke amount W) (see FIG. 6).

(3) Operation of L-R Brake

Next, an operation of the L-R brake 60 will be described.

(i) Disengaged State

In a disengaged state of the L-R brake 60, no oil pressure is supplied to the A-chamber 61 and the B-chamber 62. Thus, as illustrated in FIG. 4, by a biasing force of the return springs 161, both of the second piston 66 and the first piston 65 are moved toward the side away from the friction plates 69a,, 69c.

The second piston 66 is stopped in a state in which the intermediate portion thereof bulged toward the non-engine side is in contact with the intermediate protrusion 3b, of the concave portion 3a. The first piston 65 is stopped in a state in which the radially-extending intermediate portion thereof is in contact with the intermediate portion of the second piston 66. That is, a position of the first piston 65 in the disengaged state and a position of the second piston 66 in the disengaged state are, respectively, an initial position of the first piston 65 and an initial position of the second piston 66.

It should be noted that the initial position of the second piston 66 is structurally constant, but the initial position of the first piston 65 is not constant, because a relative position of the first piston 65 with respect to the second piston 66 variously changes depending on an aftermentioned zero-clearance position. However, the following operation will be described based on an assumption that the first piston 65 at its initial position is located at a position structurally most away from the friction plates 69a,, 69c, (the intermediate portion of the first piston 65 at its initial position is in contact with the intermediate portion of the second piston 66 at its initial position).

On an assumption that a distance by which the second piston 66 can be moved from this disengaged position toward the side close to the friction plates 69a,, 69c, until the movement is restricted by the stopper member 160, i.e., a stroke amount of the second piston 66, is represented as W, and a clearance in the friction plates 69a,, 69c, is represented as V, dimensions of the portions of the L-R brake 60 are set to satisfy the following relationship: W ≤V, preferably, W=V.

In FIG. 4, for the sake of expedience, a distance between an engine-side surface of the retaining plate 69d,, and a non-engine-side surface of the facing material 69b, bonded to a non-engine-side surface of the friction plate 69a, located at the farthest position on the non-engine side, as measured when all of the friction plates 69a,, 69c, are located in adjacent relation to each other in a non-pressed state (a state in which each of the facing materials 69b is not deformed), and the friction plate 69c, located at the nearest position on the engine side is in contact with the outer peripheral portion (i.e., pressing portion) of the first piston bulged toward the non-engine side, is indicated as the clearance V.

(ii) Engagement Operation—Movement to Standby Position

In an operation of engaging the L-R brake 60 being in the disengaged state, the oil pressure is first supplied to the B-chamber 62 in the situation where the first piston 65 and the second piston 66 are located at their respective initial positions. Thus, as illustrated in FIG. 6, by the oil pressure supplied to the B-chamber 62, the second piston 66 and the first piston 65 fitted in the second piston 66 are moved by a stroke toward the side close to the friction plates 69a,, 69c.

In this process, the second piston 66 is moved by a stroke while compressing the return springs 161, i.e., against the biasing force of the return springs 161.

The second piston 66 is stopped when the radially-extending portion thereof between the outer rim portion protruding toward the non-engine side and the outer peripheral portion bulged toward the engine side comes into contact with the stopper member 160. The first piston 65 is stopped while keeping the contact state between the radially-extending intermediate portion thereof and the intermediate portion of the second piston 66. That is, a position of the first piston 65 and a position of the second piston 66 at an end of the stroke of the second piston 66 are, respectively, a standby position of the first piston 65 and a standby position of the second piston 66. These standby positions are determined by the stopper member 160.

It should be noted that the standby position of the second piston 66 is structurally constant, but the standby position of the first piston 65 is not constant, because the relative position of the first piston 65 with respect to the second piston 66 variously changes depending on the aftermentioned zero-clearance position, as mentioned above. However, the following operation will be described based on an assumption that the intermediate portion of the first piston 65 at its standby position is in contact with the intermediate portion of the second piston 66 at its standby position.

In this standby state, (the stroke amount W of the second piston 66)≤(the clearance V in the friction plates 69$a_,$, 69$c$), preferably, (the stroke amount W of the second piston 66)= (the clearance V in the friction plates 69$a_,$, 69$c$). Thus, even when a remainder of the stroke amount W of the second piston 66 becomes zero, the first piston 65 does not yet press the friction plates 69$a_,$, 69$c$, (i.e., engagement of the L-R brake 60 is not yet started). Specifically, when W<V, the clearance in the friction plates 69$a_,$, 69$c$, is narrowed (i.e., engagement responsiveness becomes better), and when W=V, the clearance in the friction plates 69$a_,$, 69$c$ becomes zero (i.e., engagement responsiveness becomes the best).

(iii) Engagement Operation—Movement to Pressing Established Position

Subsequently, the oil pressure is supplied to the A-chamber 61 in the situation where the first piston 65 and the second piston 66 are located at their respective standby positions. Thus, as illustrated in FIG. 7, by the oil pressure supplied to the A-chamber 61, only the first piston 65 is moved by a stroke toward the side close to the friction plates 69$a_,$, 69$c$.

In this process, the first piston 65 is moved by a stroke without any influence of the return springs 161.

The first piston 65 is moved to press the friction plates 69$a_,$, 69$c$, by the pressing portion thereof, and then stopped when effective pressing of the friction plates 69$a_,$, 69$c$, is established, i.e., rotation of the drive plates 69$a$, is stopped. That is, a position of the first piston 65 at an end of the stroke of the first piston 65 is a pressing established position of the first piston 65. At the pressing established position, each of the drive plates 69$a_,$, the facing materials 69$b_,$, the driven plates 69$c_,$, the retaining plate 69$d$, and the snap ring 69$e$, is elastically deformed by receiving a pressing force of the first piston 65 (in particular, a thickness of each of the facing materials 69$b$, becomes thin). In this way, an engaged state of the L-R brake 60 is established.

(iv) Disengagement Operation—Movement to Zero-Clearance Position

In an operation of disengaging the L-R brake 60 being in the engaged state, the oil pressure in the A-chamber 61 is first discharged in the situation where the first piston 65 is located at the pressing established position, and the second piston 66 is located at its standby position. Thus, the pressing force of the first piston 65 is eliminated. Thus, as illustrated in FIG. 6, according to an elastic restoring force of the friction plates (including the drive plates 69$a_,$, the facing materials 69$b_,$, the driven plates 69$c_,$, the retaining plate 69$d$, and the snap ring 69$e$) which have been pressed until then, only the first piston 65 is moved toward the side away from the friction plates 69$a_,$, 69$c$.

The first piston 65 is pushed back by the elastic restoring force, and stopped when the pressing of the friction plates 69$a_,$, 69$c$, is completely released. At this point, the first piston 65 is located at a position where the clearance in the friction plates 69$a_,$, 69$c$, has a minimum value in a clearance range incapable of performing driving force transmission (i.e., at a position where the clearance is zero). That is, the position of the first piston 65 at this point is a zero-clearance position of the first piston 65.

This zero-clearance position is determined by structural conditions (e.g., dimensions such as thickness) of the friction plates (including the drive plates 69$a_,$, the facing materials 69$b_,$, the driven plates 69$c_,$, the retaining plate 69$d$, and the snap ring 69$e$), and reflects a current structural status (such as a reduction in thickness due to wear). For example, in the case where the friction plates 69$a_,$, 69$c$, are relatively new, the push-back distance of the first piston 65 is relatively long because the reduction in thickness of the friction plates 69$a_,$, 69$c$ due to wear, or the like, is small, so that the zero-clearance position is displaced toward the engine side. On the other hand, in the case where the friction plates 69$a_,$, 69$c$, are relatively old, the push-back distance of the first piston 65 is reduced because the reduction in thickness of the friction plates 69$a_,$, 69$c$, due to wear, or the like, becomes larger, so that the zero-clearance position is displaced toward the non-engine side.

The standby position of the first piston 65 before the engagement of the L-R brake 60 is not always coincident with the zero-clearance position of the first piston 65 after the engagement of the L-R brake 60. That is, every time the L-R brake 60 is engaged, the zero-clearance position is updated according to the current structural status of the friction plates, so that the relative position of the first piston 65 with respect to the second piston 66 variously changes depending on the zero-clearance position. Therefore, in many cases, the standby position of the first piston 65 before the engagement of the L-R brake 60 is not coincident with the zero-clearance position of the first piston 65 after the engagement of the L-R brake 60.

(v) Disengagement Operation—Movement to Initial Position

Subsequently, the oil pressure in the B-chamber 62 is discharged in the situation where the first piston 65 is located at the zero-clearance position, and the second piston 66 is located at its standby position. Thus, as illustrated in FIG. 4, both of the second piston 66 and the first piston 65 are moved toward the side away from the friction plates 69$a_,$, 69$c$, by the biasing force of the return springs 161, and set at their respective initial positions. In this way, the disengaged state of the L-R brake 60 is established.

During the above movement, the return springs 161 act only on the second piston 66 without acting on the first piston 65, so that the relative position of the first piston 65 with respect to the second piston 66 is maintained without being disordered. That is, the first piston 65 and the second piston 66 are returned to their initial positions, while preserving a record of the zero-clearance position.

The initial position of the first piston 65 before the engagement of the L-R brake 60 is not always coincident with the initial position of the first piston 65 after the engagement of the L-R brake 60. That is, every time the L-R brake 60 is engaged, the zero-clearance position is updated according to the current structural status of the friction plates, so that the relative position of the first piston 65 with respect to the second piston 66 variously changes depending on the zero-clearance position. Therefore, in many cases, the initial position of the first piston 65 before the engagement of the L-R brake 60 is not coincident with the initial position of the first piston 65 after the engagement of the L-R brake 60.

(4) Control Operation of Controller

Figure 8:
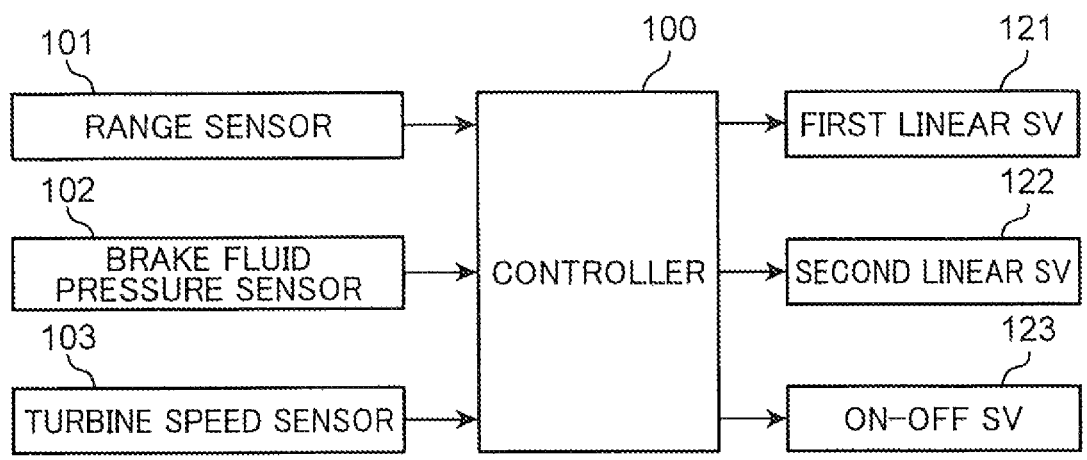
FIG. 8 is a block diagram of a control system for the automatic transmission.

The automatic transmission 1 according to the first embodiment comprises a controller 100 as illustrated in FIG. 8. This controller 100 is configured to control supply and discharge of the oil pressure with respect to the oil pressure chamber of the low clutch 40 and supply and discharge of the oil pressure with respect to the A-chamber 61 and the B-chamber of the L-R brake 60. The controller 100 is a microprocessor constructed using a CPU, a ROM and a RAM in a well-known manner, and is equivalent to "oil pressure control device" set forth in the appended claims. Specifically, the controller 100 is configured to receive inputs of a signal from a range sensor 101 for detecting a selected shift range, a signal from a brake fluid pressure sensor 102 for detecting a brake fluid pressure reflecting an amount of depression of a brake pedal, and a signal from a turbine speed sensor 103 for detecting a rotational speed of the input shaft 4, and, based on the received signals, output a control signal to each of the first linear SV 121, the second linear SV 122 and the on-off SV 123 in the hydraulic circuit 200 to thereby perform N-D control. The N-D control is designed to control transition from a state in which the low clutch 40 and the L-R brake 60 are disengaged to cut off the driving force transmission path of the speed change mechanism 30, to a state in which the low clutch 40 and the L-R brake 60 are engaged to establish the forward 1st speed stage as one example of the vehicle-start speed stage.

Next, the N-D control operation to be performed by the controller 100 will be described based on the flow chart illustrated in FIG. 9 and the time chart illustrated in FIG. 10.

Before the N-D control is started (before Time t1), an N range is selected. In the N range, an amount of energization of the first linear SV 121 is set to zero, so that a low clutch pressure (oil pressure in the oil pressure chamber of the low clutch 40) is drained, and thereby the low clutch 40 is in a disengaged state. Further, the on-off SV 123 is set to the OFF state, so that the spool of the shift valve 130 is located at the rightmost (in FIG. 3) position. Thus, an A-chamber oil pressure (oil pressure in the A-chamber 61) and a B-chamber oil pressure (oil pressure in the B-chamber 62) of the L-R brake 60 are drained, and thereby the L-R brake 60 is in the disengaged state. As a result, the first piston 65 and the second piston 66 are located at their respective initial positions, so that the clearance in the friction plates 69a,, 69c is maintained at a relatively large level. Suppose that the brake fluid pressure is relatively high, i.e., a driver has not issued a vehicle start request. In the N range, an amount of energization of the second linear SV 122 is also set to zero.

Then, when the controller 100 determines, based on the signal from the range sensor 101, that a shift operation from the N range to a D range is performed, the controller 100 starts the N-D control (Time t1).

Specifically, in Step S1, the controller 100 operates to increase the amount of energization of the first linear SV 121 from zero to a maximum value (Max). As a result, the low clutch pressure is increased to the line pressure (PL), so that the low clutch 40 is engaged.

In the Step S1, the controller 100 also operates to switch the on-off SV 123 from the OFF state to an ON state. As a result, the spool of the shift valve 130 is moved to a leftmost (in FIG. 3) position to communicate between the B-chamber 62 of the L-R brake 60 and the line pressure supply oil passage 124, so that the B-chamber oil pressure is increased to the line pressure (PL). Thus, the first piston 65 and the second piston 66 are moved by a stroke to reach their respective standby positions, so that the clearance becomes zero (Time t2). At this point, the turbine speed is slightly reduced to N1.

Subsequently, in Step S2, when the controller 100 determines, based on the signal from the brake fluid pressure sensor 102, that the brake fluid pressure is reduced to less than a given value (a driver has issued the vehicle start request), the controller 100 operates to gradually increase the amount of energization of the second linear SV 122 from zero (Time t3). Thus, the oil pressure is supplied to the A-chamber 61 of the L-R brake 60, so that the A-chamber oil pressure is gradually increased. As a result, the first piston 65 is moved by a stroke to reach the pressing established position, so that the turbine speed is further reduced.

Subsequently, in Step S3, when the controller 100 determines, based on the signal from the turbine speed sensor 103, that the turbine speed is reduced to a target value N2 (effective pressing of the friction plates 69a,, 69c, is established, i.e., rotation of the drive plates 69a, is stopped), the controller 100 operates to increase the amount of energization of the second linear SV 122 to a maximum value (Max) (Time t4). As a result, the A-chamber pressure is increased to the line pressure (PL), so that the L-R brake 60 is engaged. The above operation makes it possible to establish the forward 1st speed stage in which the low clutch 40 and the L-R brake 60 are engaged.

Heretofore, the forward 1st stage was established using a one-way clutch, instead of the L-R brake 60. The use of the one-way clutch provides an advantage that the one-way clutch is automatically locked only by engaging the low clutch to thereby form a driving force transmission path for the forward 1st speed stage. Thus, it becomes possible to favorably suppress a speed-change shock or the like due to a deviation in engagement timing of the frictional engagement element.

On the other hand, the one-way clutch leads to increases in cost, weight and size of an automatic transmission. Moreover, it runs idle during most of a traveling period, so that drag resistance occurs, causing deterioration in fuel efficiency.

Therefore, in the first embodiment, the one-way clutch is removed, and the forward 1st speed stage is established by engaging the low clutch 40 and the L-R brake 60.

However, if an engagement timing of one of the low clutch 40 and the L-R brake 60, specifically one of the frictional engagement elements which is engaged later, is deviated, an unconformable speed-change shock occurs. In particular, the vehicle-start speed stage such as the forward 1st speed stage is performed at a relatively large speed reduction ratio and under a relatively large torque, so that a larger speed-change shock is likely to occur.

In the first embodiment, with a focus on the fact that, in a clutch element, a centrifugal oil pressure is generated in an oil pressure chamber thereof, whereas a brake element is free from generation of centrifugal oil pressure in an oil pressure chamber thereof, the low clutch 40 which comes under an influence of the centrifugal oil pressure is engaged first, and the L-R brake 60 which is free of the influencer of the centrifugal oil pressure is engaged later. In this case, the L-R brake 60 free of the influencer of the centrifugal oil pressure is engaged later, so that the L-R brake 60 can be engaged accurately at an adequate timing.

Further, in the first embodiment, the L-R brake 60 is formed as a two-stage piston and two-stage stroke structure, configured such that, when a possibility arises that the L-R brake 60 is engaged (at the Time 0), the first piston 65 is moved by a stroke to reach its standby position to thereby narrow the clearance in the friction plates 69a,, 69c,, and then when it becomes necessary to engage the L-R brake 60 (at the Time t3), the first piston 65 is moved from the standby position by a stroke to reach the pressing established position. Thus, it becomes possible to engage the L-R brake 60 with good responsiveness, i.e., engage the L-R brake 60 accurately at an adequate timing, to thereby more favorably suppress a speed-change shock or the like due to a deviation in engagement timing of the L-R brake 60.

(5) Effects

As above, the L-R brake 60 for the automatic transmission 1 according to the first embodiment comprises the first piston 65 configured to press the friction plates 69a,, 69c,, and the second piston 66 configured to move the first piston 65 toward the side close to the friction plates 69a,, 69c,, wherein the first piston 65 and the second piston 66 are arranged in series along the stroke direction, in this order from the side of the friction plates 69a,, 69c,, and has the following distinctive features.

The first piston 65 is fitted in the second piston 66 in such a manner as to be movable together with the second piston 66 and relatively movable with respect to the second piston 66. The L-R brake 60 further comprises: the A-chamber 61 configured to be supplied with an oil pressure for moving the first piston 65 by a stroke toward the side close to the friction plates 69a,, 69c;, the B-chamber 62 configured to be supplied with an oil pressure for moving the second piston 66 by a stroke toward the side close to the friction plates 69a,, 69c;, the return springs 161 acting only on the second piston 66 to bias the second piston 66 and the first piston 65 toward a side away from the friction plates 69a,, 69c;, and the stopper member 160 configured to act only on the second piston 66 to prevent a stroke of the second piston 66 toward the side close to the friction plates 69a,, 69c, from becoming greater than the given value W.

On the assumption that a stroke amount of the second piston 66 and the first piston 65 to be obtained when the oil pressure is supplied to the B-chamber 62 is represented as W, and a clearance in the friction plates 69a,, 69c, of the L-R brake 60 is represented as V, W≤V. When the oil pressure is supplied to the A-chamber, the first piston 65 is moved from a position where each of the first piston 65 and the second piston 66 is moved by the stroke amount W (standby position) to effectively press the friction plates 69a,, 69c, to thereby establish engagement.

Thus, (i) when no oil pressure is supplied to the A-chamber 61 and the B-chamber 62, both of the second piston 66 and the first piston 65 are moved toward the side away from the friction plates 69a,, 69c, by the biasing force of the return springs 161, and set at their respective initial positions (FIG. 4).

(ii) When the oil pressure is supplied to the B-chamber 62 in a situation where the first piston 65 and the second piston 66 are located at their respective initial positions, each of the second piston 66 and the first piston 65 is moved by the stroke amount W toward the side close to the friction plates 69a,, 69c,, and set at their respective standby positions (FIG. 6). At this point, the clearance in the friction plates 69a,, 69c, is reduced to zero or (V−W). The standby positions are determined by the stopper member 160.

(iii) When the oil pressure is supplied to the A-chamber 61 in a situation where the first piston 65 and the second piston 66 are located at their respective standby positions, only the first piston 65 is moved by a stroke toward the side close to the friction plates 69a,, 69c, and set at the pressing established position where effective pressing of the friction plates 69a, 69c, is established (FIG. 7). At this point, the first piston 65 effectively presses the friction plates 69a,, 69c, to establish the engagement. In this way, an engaged state of the L-R brake 60 is established.

(iv) When the oil pressure in the A-chamber 61 is discharged in a situation where the first piston 65 is located at the pressing established position and the second piston 66 is located at its standby position, only the first piston 65 is moved toward the side away from the friction plates 69a,, 69c, according to an elastic restoring force of the friction plates (including the drive plates 69a,, the facing materials 69b,, the driven plates 69c,, the retaining plate 69d and the snap ring 69e) which have been pressed until then, and set at the zero-clearance position where a pressed state of the friction plates 69a,, 69c, is released (FIG. 6).

(v) When the oil pressure in the B-chamber 62 is discharged in a situation where the first piston 65 is located at the zero-clearance position and the second piston 66 is located at its standby position, both of the second piston 66 and the first piston 65 are moved toward the side away from the friction plates 69a,, 69c, by the biasing force of the return springs 161, while maintaining the relative positional relationship between the first piston 65 and the second piston 66, and set at their respective initial positions (FIG. 4). In this way, the L-R brake 60 is returned to the disengaged state in (i).

In the L-R brake 60 configured as above, during the disengaged state, (i) the first piston 65 and the second piston 66 are located at their respective initial positions; during the engagement operation, (ii) the first piston 65 and the second piston 66 are moved and set at their respective standby positions, and then (iii) only the first piston 65 is moved and set at the pressing established position; and during the disengagement operation, (iv) only the first piston 65 is moved and set at the zero-clearance position, and then (v) the first piston 65 and the second piston 66 are moved and set at their respective initial positions, whereby the L-R brake 60 is returned to the disengaged state in (i).

In (iv), the first piston 65 from which the oil pressure is being discharged is pushed back according to the elastic restoring force of the friction plates (including the drive plates 69a,, the facing materials 69b,, the driven plates 69c,, the retaining plate 69d, and the snap ring 69e), and set at the zero-clearance position where the pressed state of the friction plates 69a, 69c, is released. This zero-clearance position means a position where the clearance in the friction plates 69a,, 69c, becomes zero, and a position just before the L-R brake 60 starts to be actually engaged.

The return springs 161 act only on the second piston 66. Thus, in (v), when the first piston 65 and the second piston 66 are returned to their respective initial positions by the biasing force of the return springs 161, a relative position of the first piston 65 with respect to the second piston 66 is maintained. That is, the zero-clearance position is recorded and preserved, without being reset when the L-R brake 60 is disengaged.

As a result, in (ii) to be performed when the L-R brake 60 is engaged in a next operational cycle, when each of the first piston 65 and the second piston 66 is moved by the stroke amount W to reach their respective standby positions, the first piston 65 is set at the zero-clearance position where the clearance in the friction plates 69a,, 69c, becomes zero. Therefore, in (iii), when the first piston 65 is moved by a stroke to reach the pressing established position, effective pressing of the friction plates 69a,, 69c, by the first piston 65 is established within a significantly short period of time. Then, in (iv), the first piston 65 is pushed back again to a new zero-clearance position, and, in (v), the first piston 65 is retuned to its initial position, while preserving a record of the new zero-clearance position, together with the second piston 66.

That is, in the initial positions and the standby positions, the relative position of the first piston 65 with respect to the second piston 66 changes depending on the zero-clearance position, and the zero-clearance position is updated every time the L-R brake 60 is engaged. Thus, for example, even in a situation where the clearance in the friction plates 69a,, 69c, is relatively large due to an individual difference between the L-R brakes 60, or in a situation where the friction plates (including the drive plates 69a,, the facing materials 69b,, the driven plates 69c,, the retaining plate 69d, and the snap ring 69e) are worn away due to aging to cause an increase in the clearance, the zero-clearance position is updated, and thereby the standby position of the first piston 65 with respect to that of the second piston 66 is changed, so that it becomes possible to prevent an increase in distance from the standby position of the first piston 65 to the pressing established position. As a result, the L-R brake 60 for the automatic transmission 1 can prevent an increase in time necessary for the first piston 65 to establish effective pressing of the friction plates 69$a_,$, 69$c_,$, i.e., can prevent deterioration in responsiveness regarding engagement of the L-R brake 60, and thus prevent deterioration in accuracy of engagement timing of the L-R brake 60.

In the first embodiment, the second piston 66 is movably fitted in the concave portion 3$a$, provided in the transmission casing 3. The first sealing members 67$a_,$, 67$b$, are oil-tightly attached to the first piston 65 in such a manner as to be slidable with respect to the second piston 66. The second sealing members 68$a_,$, 68$b_,$, 68$c$, are oil-tightly attached to the second piston 66 in such a manner as to be slidable with respect to the concave portion 3$a$.

In the L-R brake 60 having this feature, the first sealing members 67$a_,$, 67$b$, oil-tightly attached to the first piston 65 are slidable with respect to the second piston 66. Thus, in (iii) and (iv), the relative movement of the first piston 65 with respect to the second piston 66 is smoothly performed. Similarly, the second sealing members 68$a_,$, 68$b_,$, 68$c$, oil-tightly attached to the second piston 66 are slidable with respect to the concave portion 3$a$. Thus, in (ii) and (v), the relative movement of the second piston 66 with respect to the concave portion 3$a$, is smoothly performed.

In the first embodiment, the L-R brake 60 is provided as a frictional engagement element configured to be engaged at the vehicle-start speed stage.

In the L-R brake 60 configured as above, even in the vehicle-start speed stage to be performed at a relatively large speed reduction ratio and under a relatively large torque, it becomes possible to effectively suppress the occurrence of a larger speed-change shock. Specifically, the vehicle-start speed stage such as a forward 1st speed stage or a reverse speed stage is performed at a relatively large speed reduction ratio and under a relatively large torque, so that, if the engagement timing of the L-R brake 60 is deviated during speed change to the vehicle-start speed stage, a larger speed-change shock is likely to occur. In this regard, the L-R brake 60 in the first embodiment is free from deterioration in engagement responsiveness and deterioration in accuracy of engagement timing. Therefore, in the first embodiment, it becomes possible to effectively suppress the occurrence of a large speed-change shock even during speed change to the vehicle-start speed stage.

In the first embodiment, the first piston 65 is moved by a stroke without any influence of the return springs 161, so that it becomes possible to facilitate setting of the A-chamber oil pressure for moving the first piston 65 by a stroke.

In the first embodiment, during disengagement of the L-R brake 60, the first piston 65 is returned to its initial position together with the second piston 66, even without undergoing any action of the return springs 161, so that the clearance in the friction plates 69$a_,$, 69$c$, is reliably increased. Thus, it becomes possible to avoid an insufficient increase in the clearance caused by a situation where the first piston 65 undergoing no action of the return springs 161 is not returned to its initial position, and thus avoid the occurrence of drag resistance.

In the first embodiment, the second piston 66 can be simply moved by a stroke until it cones into contact with the stopper member 160, so that it becomes possible to facilitate setting of the B-chamber oil pressure for moving the second piston 66 by a stroke. That is, it is only necessary to supply a sufficiently high oil pressure to the B-chamber 62, even without accurately taking into account the biasing force of the return springs 161. This makes it possible to become free from an influence of an individual difference between the return springs 161.

<Second Embodiment>

Next, a second embodiment of the present invention will be described, wherein only a distinctive part of the second embodiment will be described, and description about the same or similar part as/to the first embodiment will be omitted.

Figure 12:
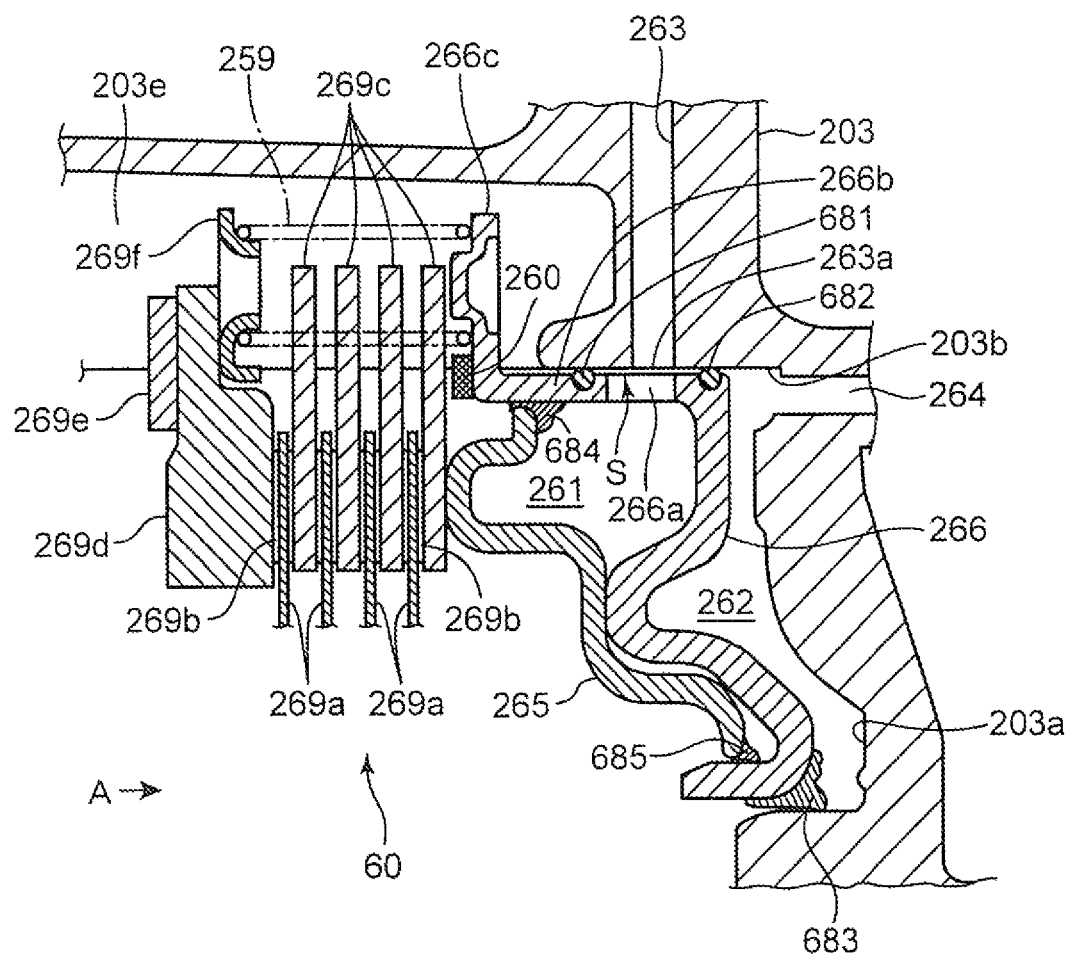
FIG. 12 is a sectional view similar to FIG. 6, which illustrates an operating state of the L-R brake in FIG. 11.
Figure 13:
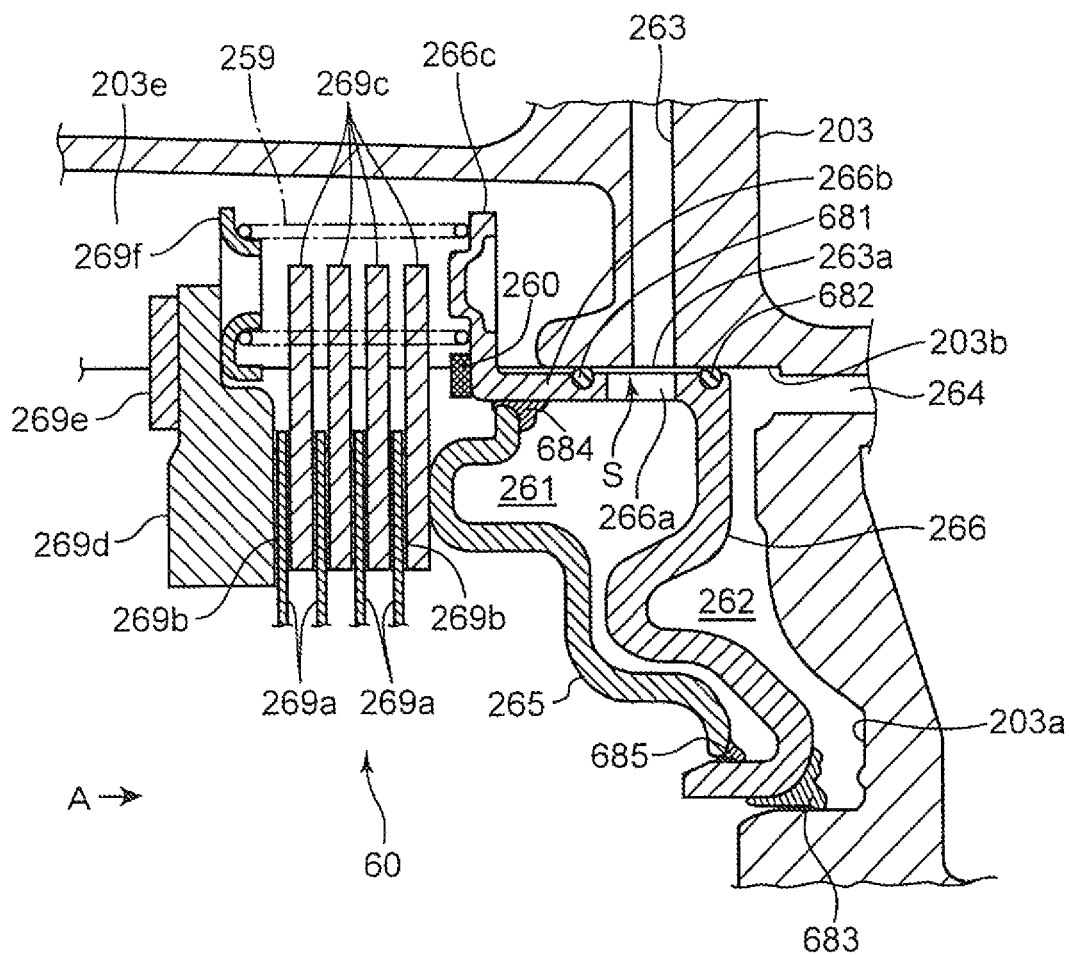
FIG. 13 is a sectional view similar to FIG. 7, which illustrates another operating state of the L-R brake in FIG. 11.

In FIGS. 11 to 13, the reference sign 203: transmission casing, 203$a$:, concave portion, 203$b$:, inner peripheral surface of the concave portion, 203$e$:, inner spline section, 259: return spring (biasing member), 260: stopper member (restriction member), 261: A-chamber (first oil pressure chamber), 262: B-chamber (second oil pressure chamber), 263: A-chamber oil passage, 263$a$:, opening of the A-chamber oil passage, 264: B-chamber oil passage, 265: first piston, 266: second piston, 266$a$:, communication hole, 266$b$:, outer peripheral surface of the second piston, 266$c$:, spring seat portion, 269$a$:, drive plate (friction plate), 269$b$:, facing material, 269$c$:, driven plate (friction plate), 269$d$:, retaining plate, 269$e$:, snap ring, 269$f$: spring seat member, 681, 682: second outer-peripheral O-ring (second sealing member), 683: second inner-peripheral sealing member (second sealing member), 684: first outer-peripheral sealing member (first sealing member), and 685: first inner-peripheral sealing member (first sealing member).

Similarly to FIG. 4, FIG. 11 illustrates a state when the first piston 265 and the second piston 266 are located at their respective initial positions, and, similarly to FIG. 6, FIG. 12 illustrates a state when the first piston 265 and the second piston 266 are located at their respective standby positions. Further, similarly to FIG. 7, FIG. 13 illustrates a state when the first piston 265 is located at a pressing established position, and the second piston 266 is located at its standby position.

As illustrated in FIGS. 11 to 13, in an L-R brake 60 according to the second embodiment, the first piston 265 is configured to press the friction plates 269$a_,$, 269$c_,$, and the second piston 266 is configured to move the first piston 265 toward a side close to the friction plates 269$a_,$, 269$c_,$, wherein the first piston 265 and the second piston 266 are arranged in series along a stroke direction, in this order from the side of the friction plates 269$a_,$, 269$c_,$, as with the first embodiment.

The first piston 265 is fitted in the second piston 266 in such a manner as to be movable together with the second piston 266 and relatively movable with respect to the second piston 266. The second piston 266 is movably fitted in the concave portion 203$a$ provided in the transmission casing 203. Each of the first outer-peripheral sealing member 684 and the first inner-peripheral sealing member 685 is oil-tightly attached to the first piston 265 in such a manner as to be slidable with respect to the second piston 266. Each of the pair of second outer-peripheral O-rings 681, 682 and the second inner-peripheral sealing member 683 is oil-tightly attached to the second piston 266 in such a manner as to be slidable with respect to the concave portion 203$a$, of the transmission casing 203. The pair of second outer-peripheral O-rings 681, 682 are disposed to the stroke direction in the outer peripheral surface 266$b$, of the second piston 266.

The A-chamber 261 is configured to be supplied with an oil pressure for moving the first piston 265 by a stroke toward the side close to the friction plates 269$a_,$, 269$c_,$, and the B-chamber 262 is configured to be supplied with an oil pressure for moving the second piston 266 by a stroke toward the side close to the friction plates 269a,, 269c. The return spring 259 is provided to act only on the second piston 266 to bias the second piston 266 and the first piston 265 toward a side away from the friction plates 269a,, 269c,, and the stopper member 260 is configured to act only on the second piston 266 to prevent a stroke of the second piston 266 toward the side close to the friction plates 269a,, 269c, from becoming greater than a given value. The return spring 259 is interposed between the spring seat member 269f, attached to the retaining plate 269d,, and the spring seat portion 266c, formed in an outer rim portion of the second piston 266. The stopper member 260 is composed of a snap ring assembled to the inner spline section 203e.

The A-chamber 261 is formed between the first piston 265 and the second piston 266, while being delimited by the first outer-peripheral sealing member 684 and the first inner-peripheral sealing member 685. The B-chamber 262 is formed between the second piston 266 and the concave portion 203a,, while being delimited by the second inner-peripheral sealing member 683 and one 682 of the pair of second outer-peripheral O-rings 681, 682 located on the side away from the friction plates 269a,, 269c, (on an engine side).

The A-chamber oil passage 263 is opened in the inner peripheral surface 203b, of the concave portion 203a, to supply and discharge an oil pressure with respect to the A-chamber 261. The B-chamber oil passage 264 is opened in a bottom surface of the concave portion 203a, to supply and discharge an oil pressure with respect to the B-chamber 262.

The communication hole 266a, is provided in the outer peripheral surface 266b, of the second piston 266 to communicate between the A-chamber 261 and the A-chamber oil passage 263. The outer peripheral surface 266b, of the second piston 266 is opposed to the inner peripheral surface 203b, of the concave portion 203a.

The pair of O-rings 681, 682 are arranged across the communication hole 266a, in the stroke direction. The pair of O-rings 681, 682 are also arranged such that one 681 thereof on the side close to the friction plates 269a,, 269c, (on a non-engine side) is always (i.e., during a period of time in which the second piston 266 is located at its initial position illustrated in FIG. 11 and at its standby position illustrated in FIGS. 12 and 13) located on the side close to the friction plates 269a,, 269c, with respect to the opening 263a, of the A-chamber oil passage 263 opened in the inner peripheral surface 203b, of the concave portion 203a,, and the other O-ring 682 on the side away from the friction plates 269a,, 269c, is always located on the side away from he friction plates 269a,, 269c, with respect to the opening 263a.

The inner peripheral surface 203b, of the concave portion 203a, is configured such that an inner diameter thereof becomes constant on the side close to the friction plates 269a,, 269c and on the side away from the friction plates 269a,, 269c,, across the opening 263a, of the A-chamber oil passage 263. That is, within a stroke range of the second piston 266, the inner peripheral surface 203b, of the concave portion 203a, in contact with the pair of O-rings 681, 682 is formed parallel to the stroke direction.

Similarly, the outer peripheral surface 266b, of the second piston 266 is configured such that an outer diameter thereof becomes constant on the side close to the friction plates 269a,, 269c, and on the side away from the friction plates 269a,, 269c,, across the communication hole 266a, of the second piston 266. That is, within an arrangement range of the pair of O-rings 681, 682, the outer peripheral surface 266b, of the second piston 266 is formed parallel to the stroke direction.

An operation and functions of the L-R brake 60 are the same as those in the first embodiment, and description thereof will be omitted here.

In the second embodiment, the A-chamber for moving the first piston 265 fitted in the second piston 266 by a stroke is formed between the first piston 265 and the second piston 266, and the A-chamber oil passage 263 for supplying and discharging an oil pressure with respect to the A-chamber 261 is opened in the inner peripheral surface 203b, of the concave portion 203a, of the transmission casing 203 in which the second piston 266 is fitted. The outer peripheral surface 266b, of the second piston 266 is opposed to the inner peripheral surface 203b, of the concave portion 203a, and provided with the communication hole 266a communicating between the A-chamber 261 and the A-chamber oil passage 263.

Further, as regards the concave portion 203a, of the transmission casing 203, the inner diameter of the inner peripheral surface 203b, is set to become constant on the side close to the friction plates 269a,, 269c, and on the side away from the friction plates 269a,, 269c,, with respect to the opening 263a, of the A-chamber oil passage 263. Further, as regards the second piston 266 fitted in the concave portion 203a, of the transmission casing 203, the outer diameter of the outer peripheral surface 266b, is set to become constant on the side close to the friction plates 269a,, 269c, and on the side away from the friction plates 269a,, 269c,, with respect to the communication hole 266a. Therefore, the inner peripheral surface 203b, of the concave portion 203a, and the outer peripheral surface 266b, of the second piston 266 are parallel to the stroke direction, around the opening 263a, of the A-chamber oil passage 263, and the communication hole 266a,, more specifically, within a movable range of the pair of O-rings 681, 682 in the stroke direction and within an arrangement range of the pair of O-rings 681, 682 in the stroke direction.

Considering the above, with a focus on a space S formed between the inner peripheral surface 203b, of the concave portion 203a, and the outer peripheral surface 266b, of the second piston 266 while being delimited by the pair of O-rings 681, 682, to allow the communication hole 266a, and the opening 263a, of the A-chamber oil passage 263 to be always opened thereto, a volume of the space S is not changed during the stroke movement of the second piston 266, as is clear from the comparison between FIGS. 11 to 13. That is, when the second piston 266 is moved by a stroke amount W from its initial position illustrated in FIG. 11 to its standby position illustrated in FIG. 12, the inner peripheral surface 203b, of the concave portion 203a, and the outer peripheral surface 266b, of the second piston 266 are relatively moved in the stroke direction. However, despite this relative movement, the volume of the space S formed between the inner peripheral surface 203b, and the outer peripheral surface 266b, while being delimited by the pair of O-rings 681, 682 is not changed. Thus, a pressure change such as generation of a negative pressure never occurs in the A-chamber 261 communicating with the space S via the communication hole 266a. As above, in the second embodiment, it is possible to obtain a particular effect of, when the second piston 266 at its initial position is moved by a stroke toward the side close to the friction plates 269a,, 269c, by supplying an oil pressure only to the B-chamber 62, preventing the occurrence of a pressure change in the A-chamber 261 to avoid an undesirable situation where the first piston 265 is moved with respect to the second piston 265, to thereby allow the first piston 265 and the second piston 265 to be moved to their respective standby positions, while reliably preserving a previous record of the zero-clearance position.

<Modifications>

In the above embodiments, the low clutch 40 is provided with a commonly-used oil chamber, without being combined with a balance chamber for cancelling out a centrifugal oil pressure. However, the balance chamber may be provided depending on the situation.

Figure 9:
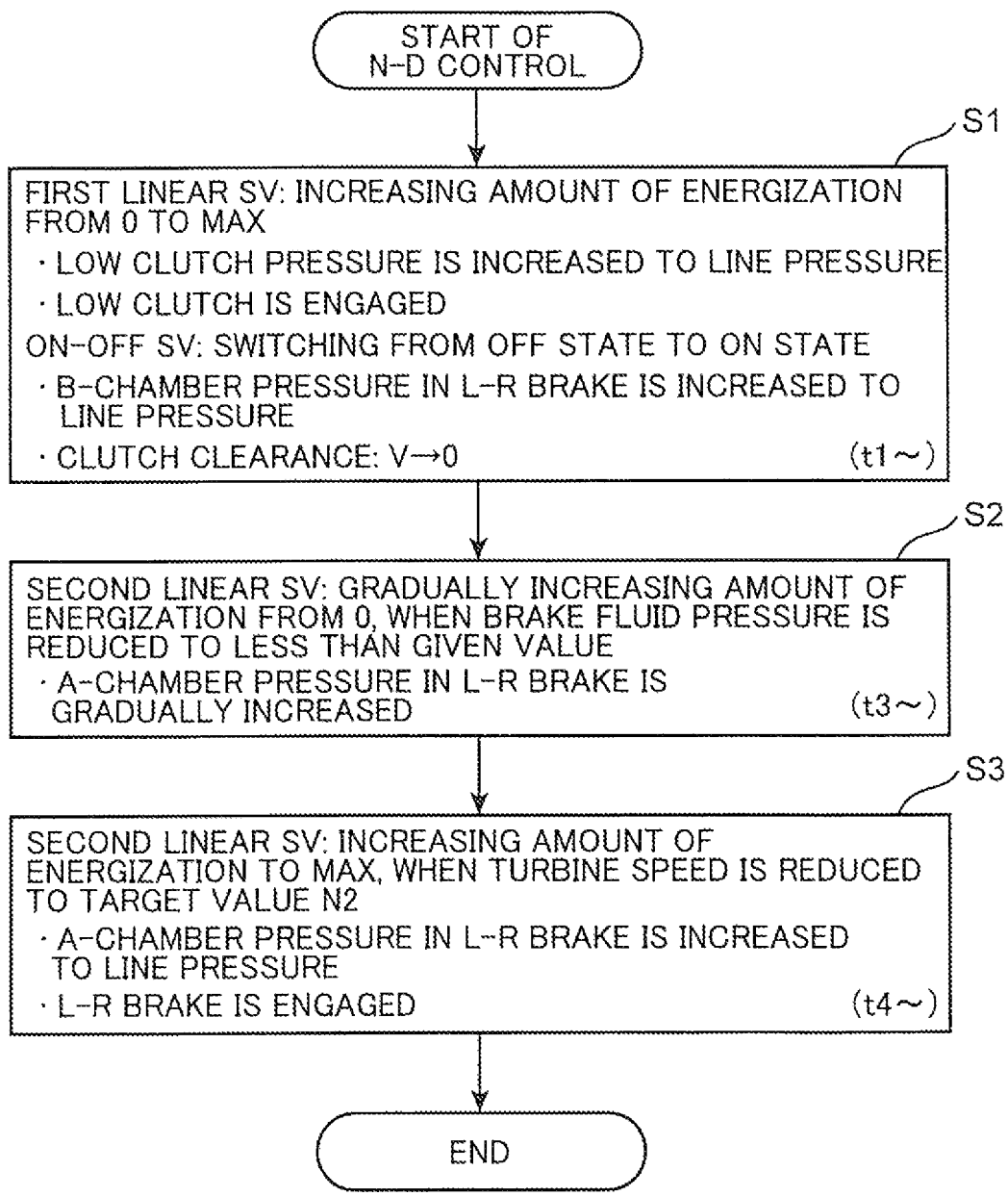
FIG. 9 is a flow chart of N-D control to be performed by a controller of the automatic transmission.
Figure 10:
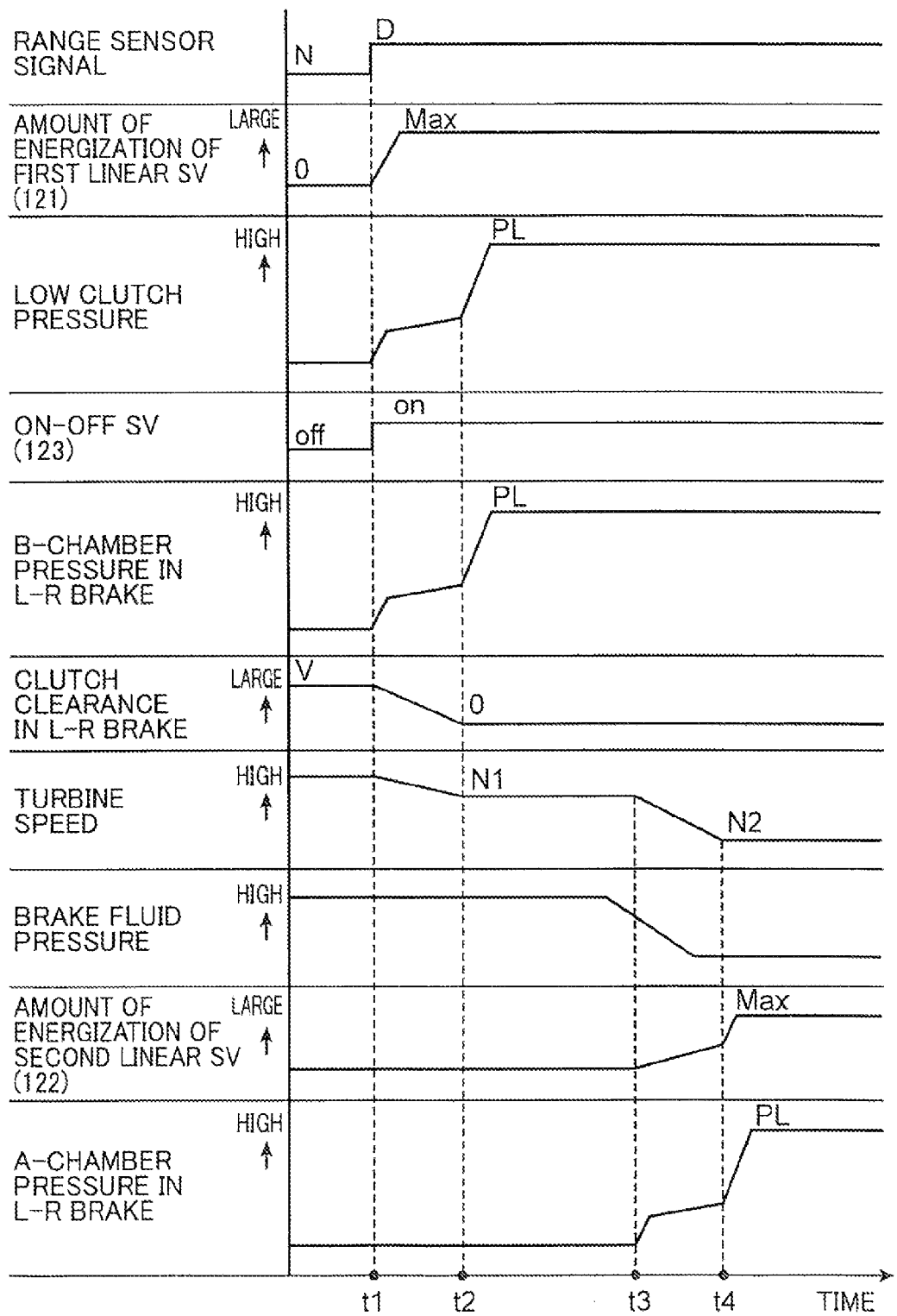
FIG. 10 is a time chart of the N-D control.

The control operation in FIGS. 9 and 10 has been described by way of an example, and may be appropriately modified without particular limitation. For example, a temporal change of the low clutch pressure, a temporal change of the A-chamber pressure and a temporal change of the B-chamber pressure may be appropriately modified to become different from those illustrated in FIG. 10. Further, the amount of energization of the second linear SV 122 may be increased from zero to the maximum value (Max) at once.

In the N-D control, the L-R brake 60 may be engaged first, and the low clutch 40 may be engaged later.

The N-D control is not limited to a control operation for establishing the forward 1st speed stage as one example of the vehicle-start speed stage from a vehicle-stopped state, but N-R control for establishing the reverse speed stage as another example of the vehicle-start speed stage from the vehicle-stopped state, i.e., a control operation of switching from a state in which the L-R brake 60 and the R-3-5, brake 80 are disengaged to cut off the driving force transmission path of the speed change mechanism 30, to a state in which the L-R brake 60 and the R-3-5, brake 80 are engaged to establish the reverse speed stage as the vehicle-start speed stage, may be performed.

For example, 2-1, speed change control during vehicle traveling, i.e., a control operation of switching from a state in which the low clutch 40 and the 2-6, brake 70 are engaged to establish the forward 2nd speed stage, to a state in which the low clutch 40 and the L-R brake 60 are engaged to establish the forward 1st speed stage, may be performed.

The brake element of the present invention may be applied to any brake element other than the L-R brake 60, for example, the 2-6, brake 70 and/or the R-3-5, brake 80.

<Outline>

The present invention described above will be outlined as follows.

According to a first aspect of the present invention, there is provided a brake element for a transmission, which comprises a first piston configured to press friction plates, and a second piston configured to move the first piston toward a side close to the friction plates, wherein the first piston and the second piston are arranged in series along a stroke direction thereof, in this order from the side of the friction plates. The brake element is characterized in that the first piston is fitted in the second piston in such a manner as to be movable together with the second piston and relatively movable with respect to the second piston, wherein the brake element further comprises: a first oil pressure chamber configured to be supplied with an oil pressure for moving the first piston by a stroke toward the side close to the friction plates; a second oil pressure chamber configured to be supplied with an oil pressure for moving the second piston by a stroke toward the side close to the friction plates; a biasing member biasing a piston toward a side away from the friction plates; and a restriction member configured to prevent a stroke of a piston toward the side close to the friction plates from becoming greater than a given value, wherein each of the biasing member and the restriction member is provided with respect to the second piston, without being provided with respect to the first piston.

In the brake element of the present invention, the first piston configured to press the friction plates is fitted in the second piston configured to move the first piston toward the side close to the friction plates, in such a manner as to be movable together with the second piston and relatively movable with respect to the second piston. Further, the biasing member biasing the first piston and the second piston toward the side away from the friction plates acts only on the second piston. Further, the restriction member configured to prevent a stroke of the second piston toward the side close to the friction plates from becoming greater than a given value is provided.

For example, the brake element of the present invention is operated as follows. In a disengaged state of the brake element, (1) no oil pressure is supplied to the first oil pressure chamber and the second oil pressure chamber, so that the second piston and the first piston are moved toward the side away from the friction plates by a biasing force of the biasing member, and set at their respective initial positions. Then, when it is necessary to engage the brake element being in the disengaged state, (2) an oil pressure is supplied to the second oil chamber, so that each of the second piston and the first piston is moved by a stroke amount W toward the side close to the friction plates, and set at their respective standby positions (at this point, a clearance in the friction plates is reduced to zero or (V-W)), and then (3) an oil pressure is supplied to the first oil chamber, so that only the first piston is moved by a stroke toward the side close to the friction plates, and set at a pressing established position (at this point, the first piston effectively presses the friction plates to establish engagement). In this way, an engaged state of the brake element is established.

On the other hand, when it is necessary to disengage the brake element being in the engaged state, (4) the oil pressure in the first oil pressure chamber is discharged, so that only the first piston is moved toward the side away from the friction plates according to an elastic restoring force of the friction plates which has been pressed until then, and set at a zero-clearance position where a pressed state of the friction plates is released, and then (5) the oil pressure in the second oil pressure chamber is discharged, so that the second piston and the first piston are moved toward the side away from the friction plates by the biasing force of the biasing member, while maintaining a relative positional relationship between the first piston and the second piston, and set at their respective initial positions. In this way the brake element is returned to the disengaged state in (1).

In (4), the first piston from which the oil pressure is being discharged is pushed back according to the elastic restoring force of the friction plates, and set at the zero-clearance position where the pressed state of the friction plates is released. This zero-clearance position means a position where the clearance in the friction plates becomes zero, and a position just before the brake element starts to be actually engaged. The biasing member acts only on the second piston. Thus, in (5), when the first piston and the second piston are returned to their respective initial positions by the biasing force of the biasing member, a relative position of the first piston with respect to the second piston is maintained. That is, the zero-clearance position is recorded and preserved, without being reset when the brake element is disengaged.

As a result, in (2) to be performed when the brake element is engaged in a next operational cycle, when each of the first piston and the second piston is moved by the stroke amount W to reach their respective standby positions, the first piston is set at the zero-clearance position where the clearance in the friction plates becomes zero. Therefore, in (3), when the first piston is moved by a stroke to reach the pressing established position, effective pressing of the friction plates by the first piston is established within a significantly short period of time. Then, in (4), the first piston is pushed back again to a new zero-clearance position, and, in (5), the first piston is retuned to its initial position, while preserving a record of the new zero-clearance position, together with the second piston.

That is, in the initial positions and the standby positions, the relative position of the first piston with respect to the second piston changes depending on the zero-clearance position, and the zero-clearance position is updated every time the brake element is engaged.

Thus, for example, even in a situation where the clearance in the friction plates is relatively large due to an individual difference between brake elements, or in a situation where the friction plates are worn away due to aging to cause an increase in the clearance, the zero-clearance position is updated, and thereby the standby position of the first piston with respect to that of the second piston is changed, so that it becomes possible to prevent an increase in distance from the standby position of the first piston to the pressing established position. As a result, the brake element for a transmission can prevent an increase in time necessary for the first piston to establish effective pressing of the friction plates, i.e., can prevent deterioration in responsiveness regarding engagement of the brake element, and thus prevent deterioration in accuracy of engagement timing of the brake element.

Preferably, in the brake element of the present invention, the second piston is movably fitted in a concave portion provided in a transmission casing, wherein the brake element further comprises a first sealing member oil-tightly attached to the first piston in such a manner as to be slidable with respect to the second piston, and a second sealing member oil-tightly attached to the second piston in such a manner as to be slidable with respect to the concave portion.

In the brake element having this feature, the first sealing member oil-tightly attached to the first piston is slidable with respect to the second piston. Thus, in (3) and (4), the relative movement of the first piston with respect to the second piston is smoothly performed. Similarly, the second sealing member oil-tightly attached to the second piston is slidable with respect to the concave portion provided in the transmission casing. Thus, in (2) and (5), the relative movement of the second piston with respect to the concave portion is smoothly performed.

More preferably, the first oil pressure chamber is formed between the first piston and the second piston, wherein the concave portion has an inner peripheral surface in which an oil passage is opened to supply and discharge an oil pressure with respect to the first oil pressure chamber, and the second piston has an outer peripheral surface opposed to the inner peripheral surface of the concave portion and provided with a communication hole communicating between the first oil pressure chamber and the oil passage, and wherein the inner peripheral surface of the concave portion is configured such that an inner diameter thereof becomes constant on the side close to the friction plates and on the side away from the friction plates, across the opening of the oil passage, and the outer peripheral surface of the second piston is configured such that an outer diameter thereof becomes constant on the side close to the friction plates and on the side away from the friction plates, across the communication hole.

In the brake element having this feature, the first oil pressure chamber for moving the first piston fitted in the second piston by a stroke is formed between the first piston and the second piston, and the oil passage for supplying and discharging an oil pressure with respect to the first oil pressure chamber is opened in the inner peripheral surface of the concave portion of the transmission casing in which the second piston is fitted. Further, the outer peripheral surface of the second piston is opposed to the inner peripheral surface of the concave portion and provided with the communication hole communicating between the first oil pressure chamber and the oil passage.

In addition, as regards the concave portion, the inner diameter of the inner peripheral surface is set to become constant on the side close to the friction plates and on the side away from the friction plates, with respect to the opening of the oil passage. Further, as regards the second piston fitted in the concave portion, the outer diameter of the outer peripheral surface is set to become constant on the side close to the friction plates and on the side away from the friction plates, with respect to the communication hole. That is, the inner peripheral surface of the concave portion and the outer peripheral surface of the second piston are parallel each other to the stroke direction, around the opening of the oil passage and the communication hole.

Thus, when the second piston is moved by a stroke amount W to reach its standby position in (2), the inner peripheral surface of the concave portion and the outer peripheral surface of the second piston are relatively moved in the stroke direction. However, despite this relative movement, a volume of a space between the inner peripheral surface and the outer peripheral surface is not changed around the opening of the oil passage and the communication hole. Therefore, a pressure change such as generation of a negative pressure never occurs in the first oil pressure chamber communicating with the space via the communication hole. As a result, it becomes possible to avoid an undesirable situation where the first piston is moved with respect to the second piston due to the pressure change during a stroke movement of the second piston in (2), to thereby allow the first piston and the second piston to be moved to their respective standby positions, while reliably preserving a previous record of the zero-clearance position.

Preferably, the brake element of the present invention is configured to be engaged at a vehicle-start speed stage.

Generally, a vehicle-start speed stage such as a forward 1st speed stage or a reverse speed stage is performed at a relatively large speed reduction ratio and under a relatively large torque, so that, if the engagement timing of the brake element is deviated during speed change to the vehicle-start speed stage, a larger speed-change shock is likely to occur. In this regard, the brake element of the present invention is free from deterioration in engagement responsiveness and deterioration in accuracy of engagement timing. Therefore, the brake element configured as above can effectively suppress the occurrence of a large speed-change shock even during speed change to the vehicle-start speed stage.

According to a second aspect of the present invention, there is provided a control system for controlling a brake element for a transmission. The brake element comprises a first piston configured to press friction plates, and a second piston configured to move the first piston toward a side close to the friction plates, wherein the first piston and the second piston are arranged in series along a stroke direction thereof, in this order from the side of the friction plates; and wherein the first piston is fitted in the second piston in such a manner as to be movable together with the second piston and relatively movable with respect to the second piston, and wherein the brake element further comprises a first oil pressure chamber configured to be supplied with an oil pressure for moving the first piston by a stroke toward the side close to the friction plates, a second oil pressure chamber configured to be supplied with an oil pressure for moving the second piston by a stroke toward the side close to the friction plates, a biasing member biasing the second piston toward a side away from the friction plates, and a restriction member configured to prevent a stroke of the second piston toward the side close to the friction plates from becoming greater than a given value. The control system is characterized in that it comprises an oil pressure control device configured to control supply and discharge of an oil pressure with respect to the first oil pressure chamber and the second oil pressure chamber, wherein the oil pressure control device is operable, when it is necessary to set the brake element to a disengaged state, to (1) supply no oil pressure to the first oil pressure chamber and the second oil pressure chamber to thereby move the second piston and the first piston toward the side away from the friction plates by a biasing force of the biasing member, to set the second piston and the first piston at their respective initial positions; when it is necessary to engage the brake element being in the disengaged state, to (2) supply an oil pressure to the second oil chamber to thereby move each of the second piston and the first piston by a stroke toward the side close to the friction plates, to set the second piston and the first piston at their respective standby positions determined by the restriction member, and then (3) supply an oil pressure to the first oil chamber to thereby move only the first piston by a stroke toward the side close to the friction plates, to set the first piston at a pressing established position where effective pressing of the friction plates is established; and when it is necessary to disengage the brake element being in the engaged state, to (4) discharge the oil pressure in the first oil pressure chamber to thereby move only the first piston toward the side away from the friction plates, to set the first piston at a zero-clearance position where a pressed state of the friction plates is released, and then (5) discharge the oil pressure in the second oil pressure chamber to thereby move the second piston and the first piston toward the side away from the friction plates by the biasing force of the biasing member, while maintaining a relative positional relationship between the first piston and the second piston, to set the second piston and the first piston at their respective initial positions.

The control system according to the second aspect of the present invention can prevent deterioration in responsiveness regarding engagement of the brake element and thus prevent deterioration in accuracy of engagement timing of the brake element, even if the clearance in the friction plates is relatively large due to an individual difference between brake elements, or the clearance in the friction plates increases, for example, due to aging of the brake element, as with the brake element according to the first aspect of the present invention.

This application is based on Japanese Patent Application Serial No. 2012-230548, filed in Japan Patent Office on Oct. 18, 2012, the contents of which are hereby incorporated by reference.

Although the present invention has been adequately and sufficiently described by way of example with reference to the accompanying drawings so as to express the present invention, it is to be understood that various changes and/or modifications will be apparent to those skilled in the art. Therefore, unless otherwise such changes or modifications depart from the scope of the present invention hereinafter defined, they should be construed as being included therein.

The invention claimed is:

1. A brake element for a transmission, comprising a first piston configured to press friction plates, and a second piston configured to move the first piston toward a side close to the friction plates, wherein the first piston and the second piston are arranged in series along a stroke direction thereof, in this order from the side of the friction plates, the brake element being characterized in that the first piston is fitted in the second piston in such a manner as to be movable together with the second piston and relatively movable with respect to the second piston, wherein the brake element further comprises:
 a first oil pressure chamber configured to be supplied with an oil pressure for moving the first piston by a stroke toward the side close to the friction plates;
 a second oil pressure chamber configured to be supplied with an oil pressure for moving the second piston by a stroke toward the side close to the friction plates;
 a biasing member acting on the second piston to bias the second piston toward a side away from the friction plates; and
 a restriction member configured to act on the second piston to prevent a stroke of the second piston toward the side close to the friction plates from becoming greater than a given value,
 wherein none of the biasing member and the restriction member acts on the first piston.

2. The brake element as defined in claim 1, wherein the second piston is movably fitted in a concave portion provided in a transmission casing, and wherein the brake element further comprises:
 a first sealing member oil-tightly attached to the first piston in such a manner as to be slidable with respect to the second piston; and
 a second sealing member oil-tightly attached to the second piston in such a manner as to be slidable with respect to the concave portion.

3. The brake element as defined in claim 2, wherein:
 the first oil pressure chamber is formed between the first piston and the second piston;
 the concave portion has an inner peripheral surface in which an oil passage is opened to supply and discharge an oil pressure with respect to the first oil pressure chamber; and
 the second piston has an outer peripheral surface opposed to the inner peripheral surface of the concave portion and provided with a communication hole communicating between the first oil pressure chamber and the oil passage,
 and wherein the inner peripheral surface of the concave portion is configured such that an inner diameter thereof becomes constant on the side close to the friction plate and on the side away from the friction plate, across the opening of the oil passage, and the outer peripheral surface of the second piston is configured such that an outer diameter thereof becomes constant on the side close to the friction plate and on the side away from the friction plate, across the communication hole.

4. The brake element as defined in claim 1, which is configured to be engaged at a vehicle-start speed stage.

5. The brake element as defined in claim 1, which is configured to be operable:
 when no oil pressure is supplied to the first oil pressure chamber and the second oil pressure chamber, to move the second piston and the first piston fitted in the second piston, toward the side away from the friction plates by the biasing member;
 in this state, when an oil pressure is supplied to the second oil chamber, to move the second piston by a stroke toward the side close to the friction plates to cause the second piston to come into contact with the restriction member and cause the first piston to come into contact with the friction plates in such a manner as to narrow a clearance in the friction plates or reduce the clearance to zero; and, in this state, when an oil pressure is supplied to the first oil chamber, to cause the first piston to press the friction plates to thereby establish an engaged state of the brake element.

6. A control system for a brake element for a transmission, the brake element comprising a first piston configured to press friction plates, and a second piston configured to move the first piston toward a side close to the friction plates, wherein the first piston and the second piston are arranged in series along a stroke direction thereof, in this order from the side of the friction plates; and wherein the first piston is fitted in the second piston in such a manner as to be movable together with the second piston and relatively movable with respect to the second piston, and wherein the brake element further comprises a first oil pressure chamber configured to be supplied with an oil pressure for moving the first piston by a stroke toward the side close to the friction plates, a second oil pressure chamber configured to be supplied with an oil pressure for moving the second piston by a stroke toward the side close to the friction plates, a biasing member biasing the second piston toward a side away from the friction plates, and a restriction member configured to prevent a stroke of the second piston toward the side close to the friction plates from becoming greater than a given value, the control system being characterized in that it comprises an oil pressure control device configured to control supply and discharge of an oil pressure with respect to the first oil pressure chamber and the second oil pressure chamber, wherein the oil pressure control device being operable, when it is necessary to set the brake element to a disengaged state, to (1) supply no oil pressure to the first oil pressure chamber and the second oil pressure chamber to thereby move the second piston and the first piston toward the side away from the friction plates by a biasing force of the biasing member, to set the second piston and the first piston at their respective initial positions;

when it is necessary to engage the brake element being in the disengaged state, to (2) supply an oil pressure to the second oil chamber to thereby move each of the second piston and the first piston by a stroke toward the side close to the friction plates, to set the second piston and the first piston at their respective standby positions determined by the restriction member, and then, to (3) supply an oil pressure to the first oil chamber to thereby move only the first piston by a stroke toward the side close to the friction plates, to set the first piston at a pressing established position where effective pressing of the friction plates is established;

and when it is necessary to disengage the brake element being in the engaged state, to (4) discharge the oil pressure in the first oil pressure chamber to thereby move only the first piston toward the side away from the friction plates, to set the first piston at a zero-clearance position where a pressed state of the friction plates is released, and then, to (5) discharge the oil pressure in the second oil pressure chamber to thereby move the second piston and the first piston toward the side away from the friction plate by the biasing force of the biasing member, while maintaining a relative positional relationship between the first piston and the second piston, to set the second piston and the first piston at their respective initial positions.

* * * * *